United States Patent [19]

Chung et al.

[11] Patent Number: 5,124,805
[45] Date of Patent: Jun. 23, 1992

[54] REMOTE CONTROL OPERATED MOVING TELEVISION RECEIVER

[75] Inventors: Nak M. Chung; Min S. Cho, both of Seoul, Rep. of Korea

[73] Assignee: Daewoo Electronics, Co., Ltd., Seoul, Rep. of Korea

[21] Appl. No.: 444,357

[22] Filed: Dec. 1, 1989

[30] Foreign Application Priority Data

Dec. 8, 1988 [KR] Rep. of Korea ............. 88-16345
Jan. 6, 1989 [KR] Rep. of Korea ............. 89-64
Jun. 22, 1989 [KR] Rep. of Korea ............. 89-8617[U]

[51] Int. Cl.$^5$ ................................. H04N 5/645
[52] U.S. Cl. ........................... 358/248; 358/100; 358/254
[58] Field of Search ............ 358/108, 100, 254, 248, 358/210

[56] References Cited

U.S. PATENT DOCUMENTS

| | | | |
|---|---|---|---|
| 2,571,903 | 10/1951 | Loewi et al. | 358/254 |
| 3,258,595 | 6/1966 | Galante | 358/210 |
| 3,689,695 | 9/1972 | Rosenfield et al. | 358/108 |
| 3,798,368 | 3/1974 | Kardach et al. | 358/108 |
| 3,813,491 | 5/1974 | Pennar | 358/254 |
| 4,203,636 | 5/1980 | Wells | 358/254 |
| 4,654,203 | 3/1987 | Viera | 358/108 |
| 4,736,218 | 4/1988 | Kutman | 358/108 |
| 4,855,838 | 8/1989 | Jones et al. | 358/100 |
| 5,043,823 | 8/1991 | Reinsch | 358/248 |

FOREIGN PATENT DOCUMENTS 2075114  11/1981  United Kingdom ............ 358/108

Primary Examiner—James J. Groody
Assistant Examiner—Jeffrey S. Murrell
Attorney, Agent, or Firm—Lowe, Price, LeBlanc & Becker

[57] ABSTRACT

A mobile TV receiver is provided in which the viewing screen can move left and right or up and down and be tipped or tilted by remote control as the viewer chooses. The TV receiver is divided into a head portion including a CRT-tube and a lower body portion accommodating driving elements and supporting the head portion. The head portion is adjustably connected to the upper part of the supporting body portion so that only the head can lean over, tilt up and down, and move upward and downward by operation of the driving elements under the viewer's control. The viewer can thus remote-control the TV set back and forth, and adjust it exactly as desired to make the TV screen comfortably visible.

28 Claims, 19 Drawing Sheets

REMOTE CONTROL OPERATED MOVING TELEVISION RECEIVER

FIELD OF THE INVENTION

The present invention relates to a TV receiver which a user can, by remote control, rotate, tip, tilt, and move left and right or up and down as desired.

DESCRIPTION OF THE PRIOR ART

Conventional TV receivers are available in a variety of designs and appearances, but the viewer (user) cannot freely move the receiver back and forth, tip, tilt or adjust up and down or right and left, as desired, using a remote control. Therefore, when the user intends to switch the direction or movement of the traditional TV set, he/she has to move the TV set itself by him/herself or manually push or pull the supporting rack which is provided with a caster. This results in various inconveniences in using the receiver. Especially, the stereotypical perception of a TV receiver, which means simply placing and viewing it in a single-fixed location, cannot readily be overcome.

Consequently, manufacturing companies as well as general consumers have longed for a hi-tech TV receiver than can, by remote control, be adjusted for convenient viewing.

SUMMARY OF THE INVENTION

The invention is designed to minimize the inconveniences of using conventional TV sets and to offer a high technological TV set, in which the TV is the head portion including CRT-tube and a body portion has installed therein driving equipment which adjustably supports the head portion. The head portion is connected onto the upper part of the supporting body position so that only the head can pan over, tilt up and down, and move upward and downward by operation of the driving equipment in a sequence.

Therefore, when a viewer steps out of vista (visual range), e.g., the viewer moves from living room to kitchen to have a meal while intending to keep on watching the TV screen simultaneously, the viewer can remote-control the head to pan left or right. Furthermore, when the TV set itself cannot be seen from the kitchen, the viewer can remote-control it back and forth and move it left and right to make the TV set visible. Even in a lying- or-leaning position, the viewer can remote-control the head, on a dolly, in and out or pan left and right to a certain angle and have the best possible viewing condition for him/herself.

This hi-tech TV invention makes it possible for a user to view the screen from any angle and any direction by remote-controlling the receiver itself.

The supporting frame (the body) of the moving TV receiver consists of a fixed frame and a fixing member to which the motor, electronic clutch, caster and driving wheel are mounted with a sprocket, chain, sector gear and screw shaft. These elements are combined with driving gear on which a transmission shaft and driving shaft are connected to the head portion above the body portion, and these are controlled to shift the mobile TV set in every desired direction.

When necessary, in a preferred embodiment of this invention, a viewer can pan only the head or TV portion left and right at a selected angle within a lateral angle of 60 degrees, incline and decline within a range of 40 degrees, tilt up and down at 15 degrees and 5 degrees, and move up and down within a range of 200 mm in height, so that the viewer can have a total control over the TV set even when moving around and out of vista.

BRIEF DESCRIPTION OF THE DRAWING

The various novel features of this invention, along with the foregoing and other objects, as well as the invention itself both as to its organization and method of operation, may be fully understood from the following description of illustrated embodiments when read in conjunction with the accompanying drawing, wherein.

DESCRIPTION OF THE PREFERRED EMBODIMENT

Figure 1:
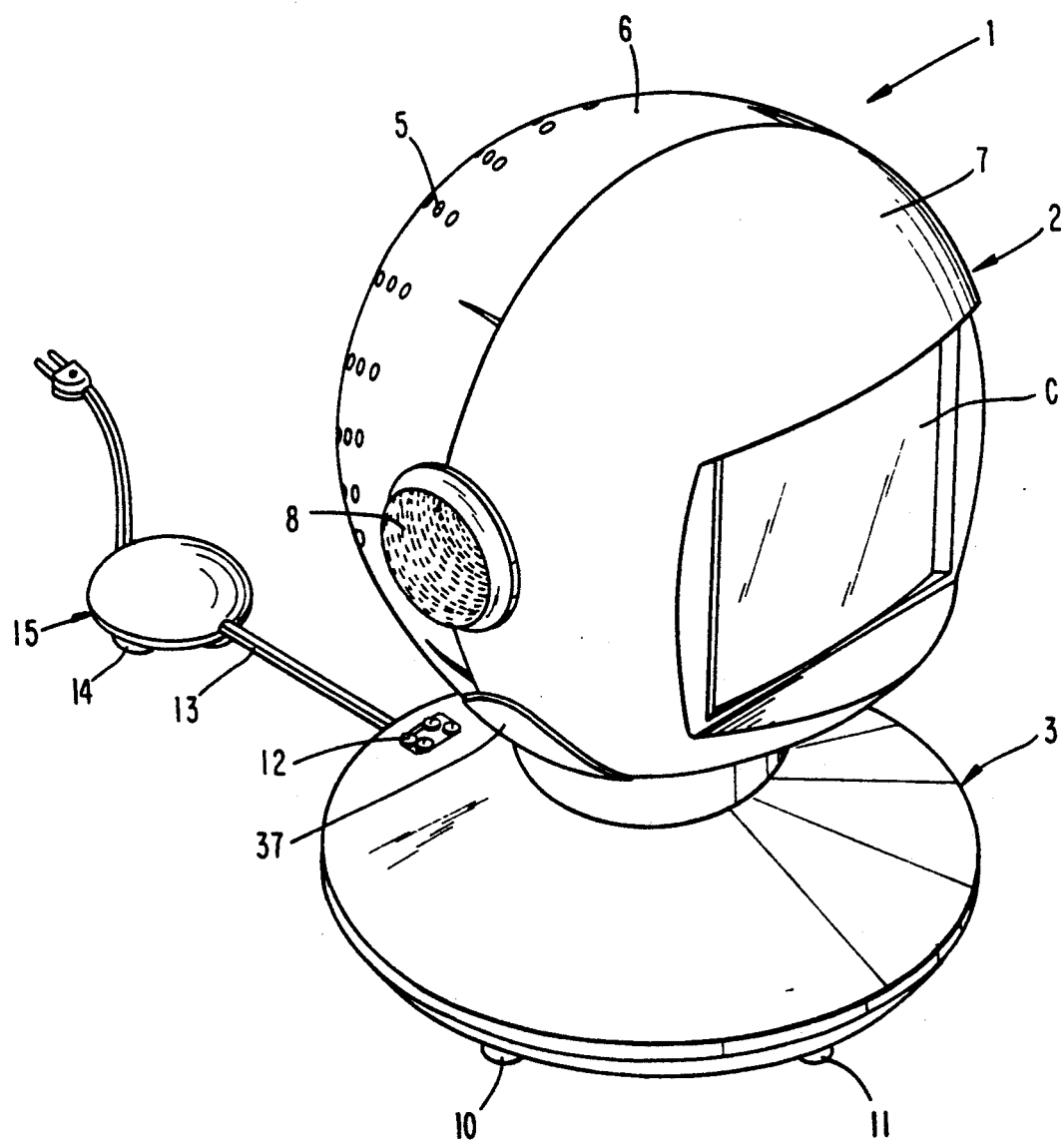
FIG. 1 is a perspective view of the moving television receiver.

As shown in FIG. 1, the upper portion of the moving TV receiver is head portion 2 in a global form similar to human head. The lower portion body portion 3, of which the internal space accommodates a plurality of driving and adjustment elements. Back cover 6 has ventilating openings 5 in it and, with the front cover 7, forms the global head 2, and a circular speaker 8 is installed at each side. A supporting cover 37, designed to prevent leaving an opening when controlling to pan or tilt head 2, is provided between the head 2 and the body 3. Below body 3, casters 11, 11' are installed on a diameter perpendicular to the driving wheels 10, 10' of the driving shafts 22 of the driving gear mechanism. On body 2, an AFT and A/V terminal plate 12 is installed to connect to an antenna cord or a terminal of a video tape recorder. Along the power cord 13 connected to the body 3, a winding device 15 may be provided, allowing the TV set to easily move back and forth and right and left. The overall appearance is thus designed to make automatic winding of cord 13 possible.

Figure 2:
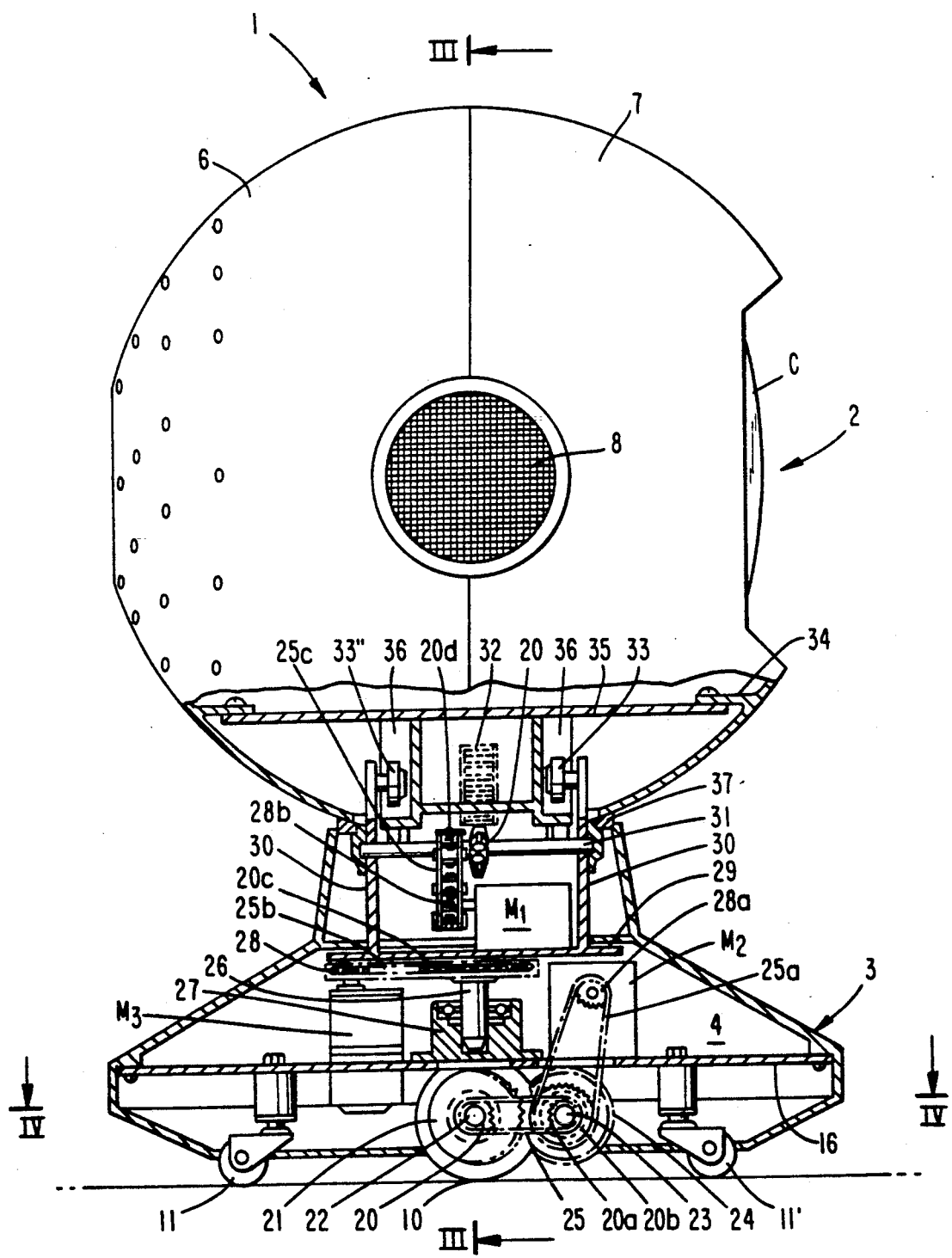
FIG. 2 is a partial vertical cross-sectional view of the moving television receiver.
Figure 3:
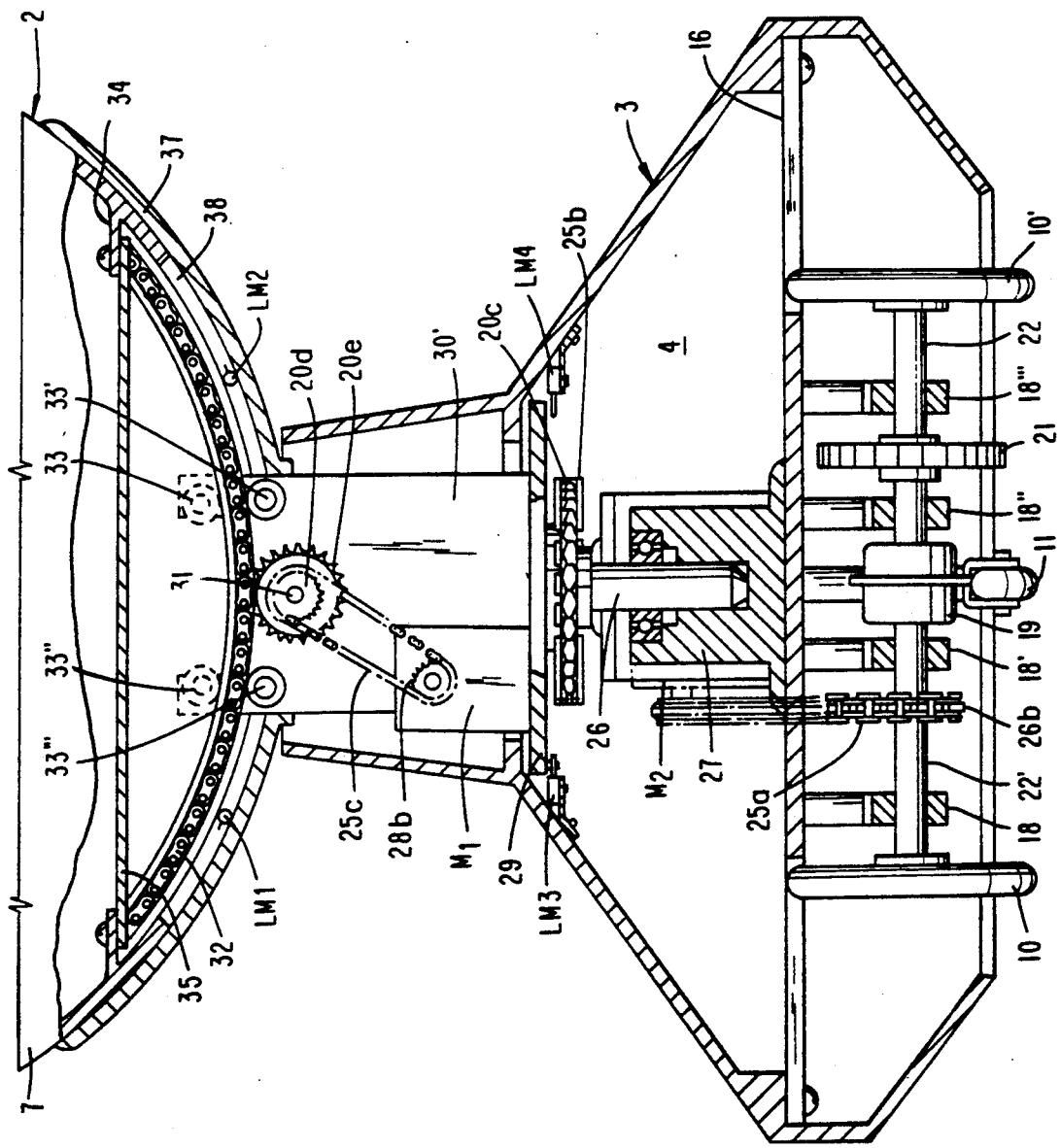
FIG. 3 is an enlarged cross-sectional view taken along the line of FIG. 2 at III—III.
Figure 5:
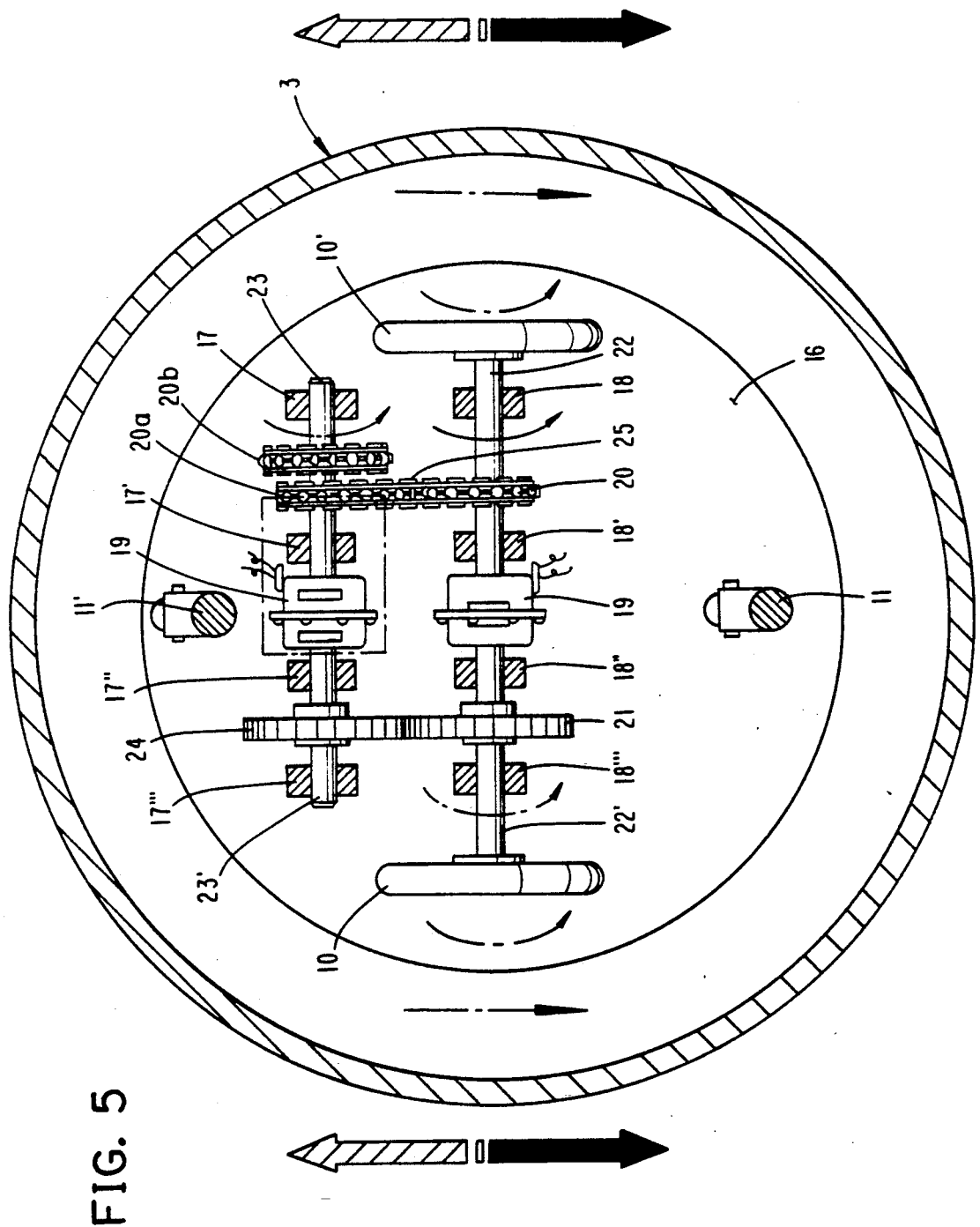
FIG. 5 is a cross-sectional view showing elements for providing back and forth movement of the receiver.
Figure 4:
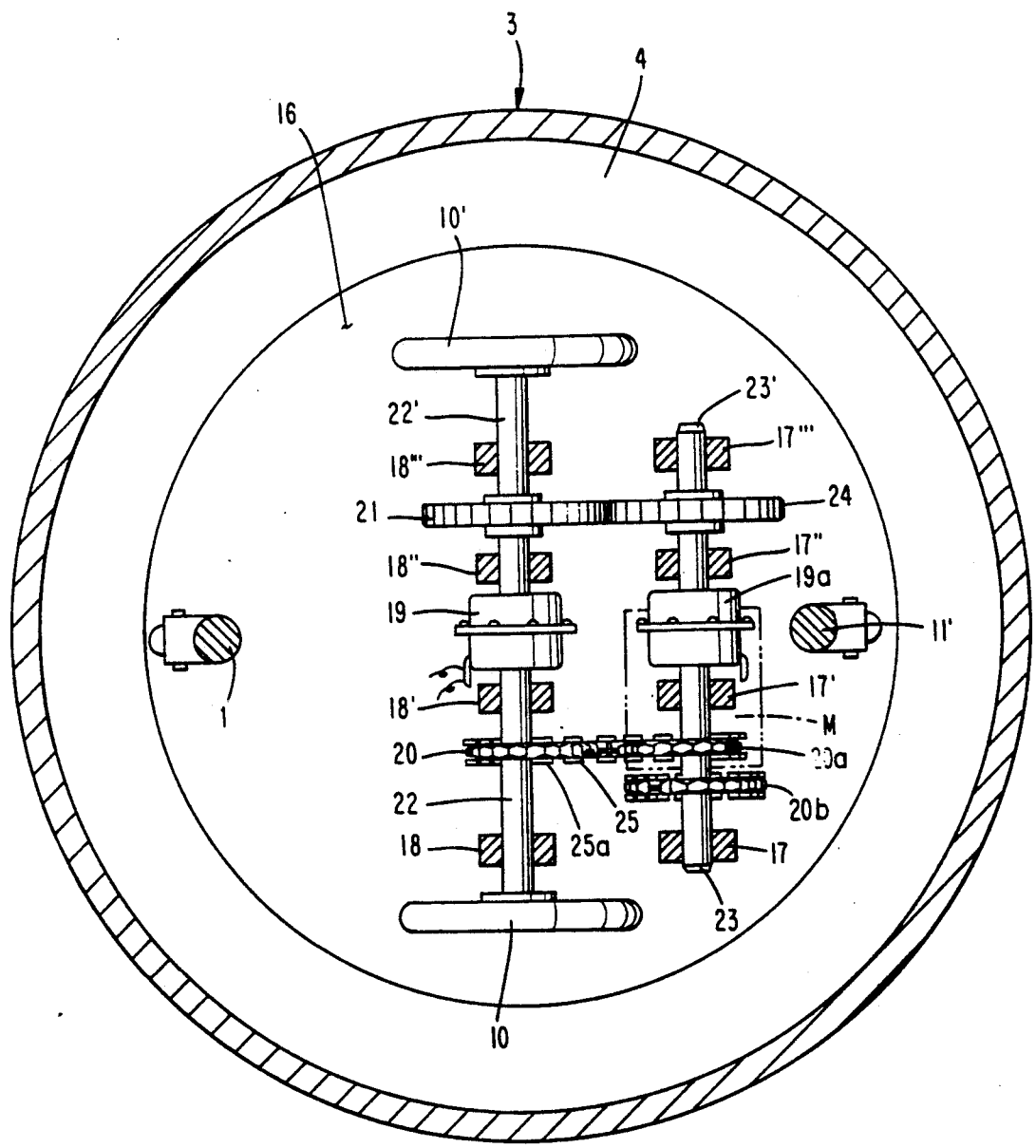
FIG. 4 is a cross-sectional view taken along the line of FIG. 2 at IV—IV.
Figure 6:
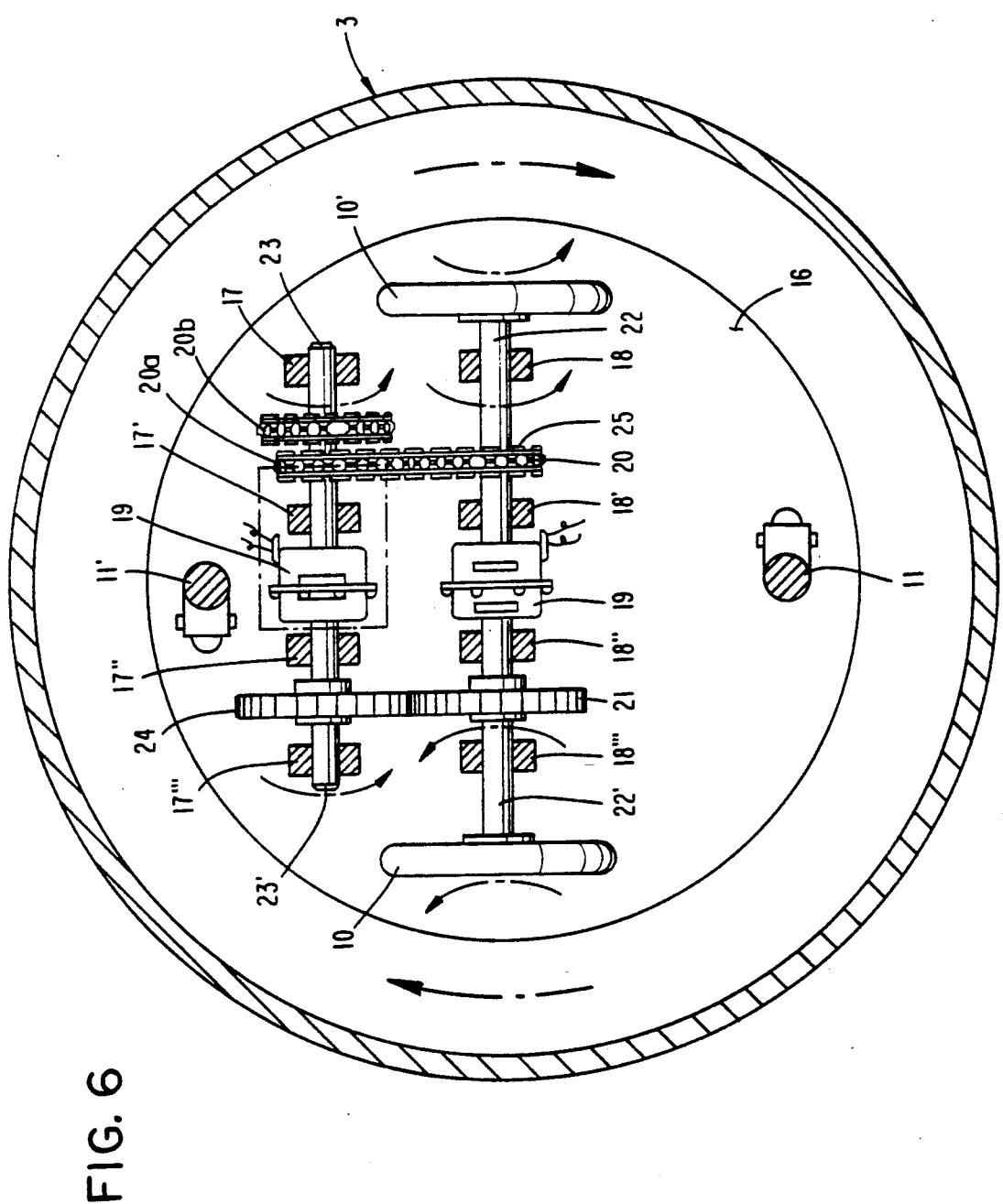
FIG. 6 is a cross-sectional plan view showing elements for providing left and right turning of the receiver.

As best seen in FIGS. 2, 3 and 4, the space 4 within the body 3 supporting the head 2 of the moving TV receiver 1 contains a fixed frame with a driving mechanism built in. Under it, transmission shaft fixed boss 17, 17', 17'', 17''' and the driving shaft fixed boss 18, 18', 18'', 18'''are integrally formed. A wheel is installed at each side of a driving shaft fixed boss. Driving shaft 22 has a magnetic clutch 19 and gear 21 installed thereon to control an applied driving force instantaneously.

This driving shaft is preferably divided into two driving shafts 22, 22' centered on the magnetic clutch 19 on it. See FIG. 4. Under the fixed frame 16 of body 3, a transmission shaft fixed boss 17, 17' supports transmission shafts 23, 23' with another magnetic clutch, 19a, installed therebetween. A driving gear 24 engages the gear 21 on the driving shafts 22, 22' to one of transmission shaft portions 23, 23'. A driving sprocket 20a is built for continuing movements of vertical sprocket 20 and the chain 25 connecting them. Beside this, another sprocket 20b is installed to reduce the driving torque on the driving shafts 22, 22'. The transmission shaft portions 23, 23' are also divided into two by the magnetic clutch 19a. The driving shafts 22, 22' and the transmission shafts 23, 23', by activating of the electronic clutches 19, 19a on the respective shafts by control of a printed circuit board within the body 3, causes the shafts to engage and disengage to control and to deliver a driving force to adjust the TV receiver position.

Underneath the fixed frame 16 in body 3, the casters 11, 11' are located on a live perpendicular to a line between the driving wheels 10, 10' on each side of the driving shafts 22, 22' and are located lower than the lower portion of the body 3, so that only the driving wheels 10, 10' of the driving shafts 22, 22' and the casters 11, 11' make contact with a supporting surface to move the entire TV receiver 1 back and forth, or left and right, by rotating movement of the casters 11, 11' following the driving wheels 10, 10' rotating by movement of the driving shafts 22, 22' and the transmission shafts 23, 23' activated by the driving elements installed in body 3.

As shown in FIG. 2, the upper portion of the fixed frame 16 in space 4 of body 3 has centered therein a perpendicular transmission shaft 26 connected to the lower side of the head 2 by a foot step bearing 27.

On opposite sides of foot step bearing 27 are provided motors M2 and M3. Small sprockets 28, 28a are installed on each motor's shaft. The small sprocket of motor M2 is connected to sprocket 20b by chain 25a around the transmission respective shafts 23, 23' below fixed frame 18 in space 4 of body 3.

Another small sprocket 28 installed on the other motor M3 of the upper fixed frame 16 is connected to the lower portion of the head set 2 of the moving TV receiver 1 in order to connect itself to a sprocket 20c on the perpendicular transmission shaft 26. Transmission shaft 28, is disposed perpendicular to foot step bearing 27 at the center of the fixed frame 16, and can pan only the head portion 2 of the moving TV receiver 1 at a particular or specified angle to left and right.

On the upper portion of the perpendicular transmission shaft 26, at the center of the fixed frame 16 of space 4, connected to the lower portion of the upper head 2 of the moving TV receiver 1, is provided a revolving disc 29. Fixing members 30, 30' are formed at each side thereon, and a motor M1 is installed between the fixing members 30, 30' to the revolving disc 29 and has a small sprocket 28b on its shaft. Extending between members 30, 30' on revolving disc 29, as shown in the FIG. 3, is a rotating shaft 31, and a sprocket 20d thereon is connected to small sprocket 28b on the shaft of a motor M1 installed on the revolving disc 29 by a chain 25c.

Another sprocket 20e is built at the center of the rotating shaft 31, designed to engage a chain rack 32 fixed onto the lower portion of the head 2. At each end of the fixing member 30, 30' on the revolving disc 29, per FIG. 3., rotating rollers 33, 33', 33'', 33''' are installed to be hung on the upper and lower portions of the supporting members 36, 36' to cooperate with the fixed disc 35 fixed to the fixed rib 34 of the upper head 2.

When the sprocket 20e at the center of the rotating shaft 31 engages with a chain rack 32 fixed to the lower head 2, control is exercised on the angle at which head 2 can decline left and right by the rotating movements of the Motor M1 on the revolving disc 29.

Also, between the lower portion of fixed rib 34 on the lower side of the fixed disc 35 (which supports the head portion 2 while being fixed onto fixed rib 34 inside the lower portion of the head 2) and body 3, a supporting cover 37 is connected to the fixing members 30, 30' supporting the head 2 at its lower side to prevent a space 38 of the fixed disc 35 from being open to the outside.

On the extreme inside supporting cover 37, built between the head portion 2 and the body 3 of the moving TV receiver, limit switches (LM1) (LM2) are installed to control the maximum angle by which head portion 2 declines left or right.

Figure 7:
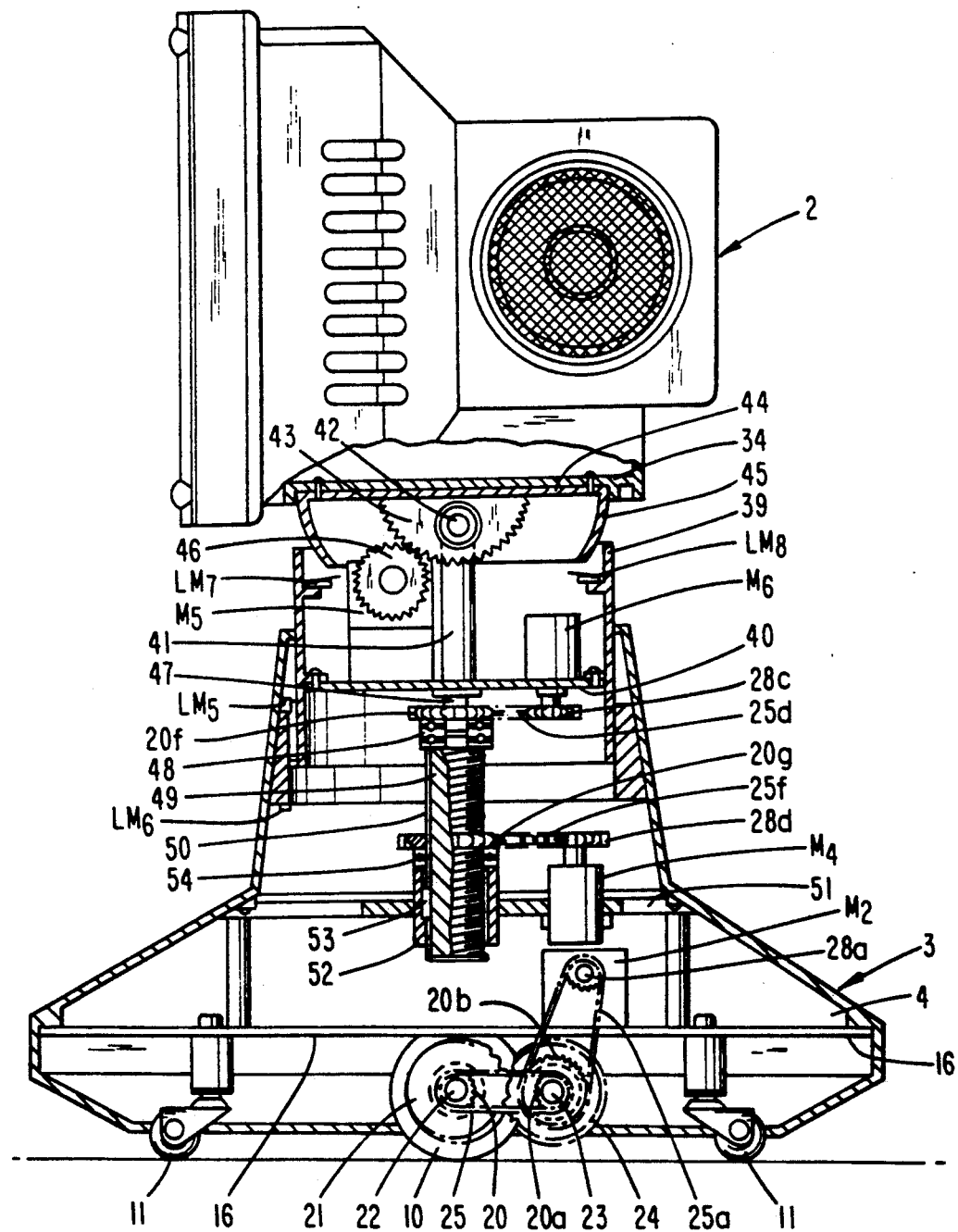
FIG. 7 is a partial vertical cross-sectional side view of the receiver to illustrate other details.
Figure 8:
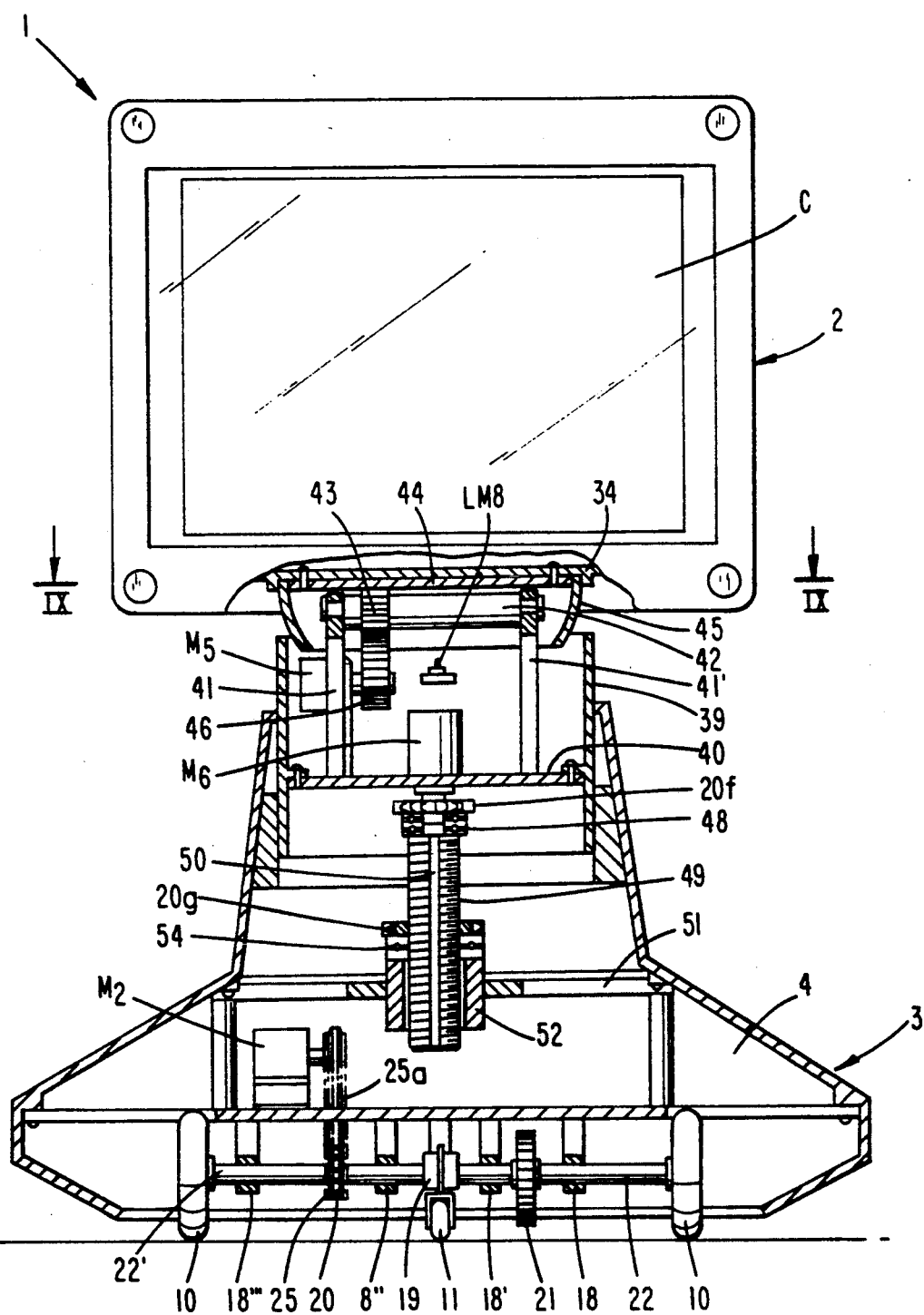
FIG. 8 is a partial sectional front-view of the receiver to illustrate other details.
Figure 9:
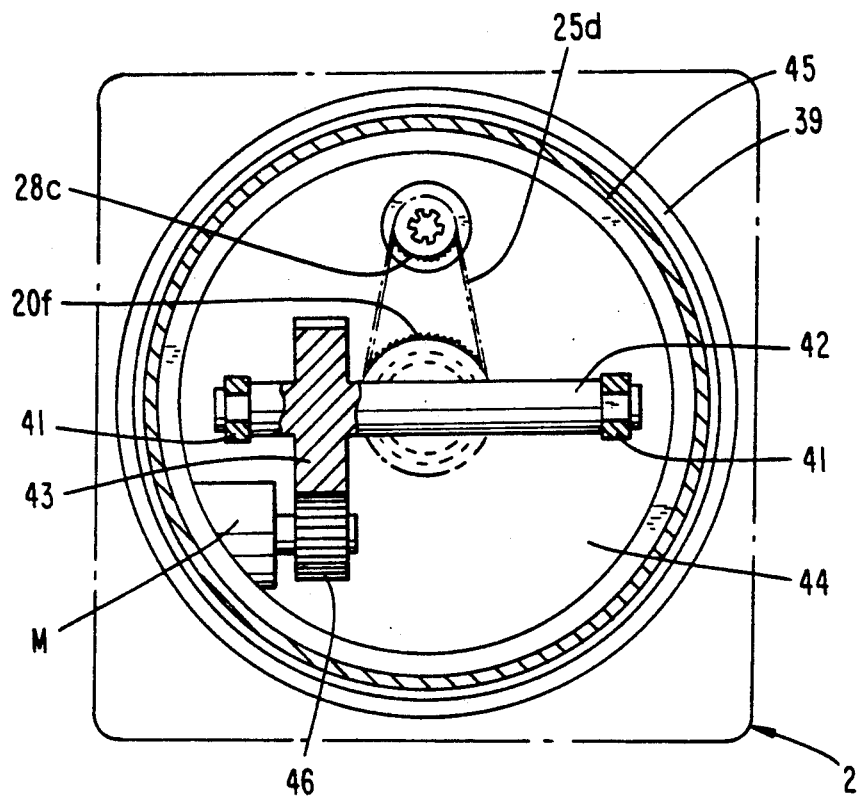
FIG. 9 is a cross-sectional view taken along line IX—IX in FIG. 8.

As best seen in FIGS. 3, 4 and 7 the moving TV receiver comprising the head 2 and the body portion 3. On the lower face of the fixed frame 16 of inner space 4, there are provided transmission fixed bosses 17, 17', 17'', 17''' as well as driving shaft fixed bosses 18, 18', 18'', 18''' integrally formed with each other. The driving shaft fixed bosses 18, 18', 18'', 18''' are fitted with driving wheels 10, 10' on the ends of driving shafts 22, 22' and also with clutch 19, sprocket 20 and driving shafts 22, 22' which are equipped with a vertical gear 21. These driving shafts 22, 22' are separated by clutch 19. The transmission fixed bosses 17, 17', 17'', 17''' support with the transmission shafts 23, 23' with the center thereof equipped with a clutch 19a. On one side of the transmission shafts 23, 23' the vertical gear 21 is engaged to a driving gear 24. On the other side, a driving sprocket 20a is connected to the vertical sprocket 20 on the driving shafts 22, 22' by a chain 52a. Next to sprocket 20a is a sprocket 20b which sends a movement to the driving shafts. The transmission shafts 23, 23' are also separated by the central clutch 19a for the driving shafts 22, 22' and the transmission shafts 23, 23' to activate the clutches 19, 19a on both shafts using the control from the print circuit board in the space room 4. Also installed are casters 11, 11'. In doing so, the body portion 3 is placed below the head 2 so that only the driving wheels 10, 10' and the casters 11, 11' contact the floor when the TV receiver is placed thereon. Thus, as the driving wheels 10, 10' rotate according to the movement of the driving shafts 22, 22' and the transmission shafts 23, 23', the casters 11, 11' rotate enabling the moving TV receiver 1 to move back and forth and left and right.

Between the head 2 and the body portion 3 is provided a moving member 39 which provides up and down movement installed. The upper half thereof supports the lower side of the head 2 and its lower half extends into the space 4 of body portion 3.

Inside the moving member 39, a fixed member 40 is installed, forming sector arms 41, 41' on its ends. At the inner side of these sector arms, a sector shaft which is integrally formed with a semi-circular sector gear 43 is provided for revolving movement. A coupling frame 44 is also integrally formed with the upper side of the sector gear 43 and fixed to the fixed rib which is installed on the inner side of the head portion 2. Surrounding the frame 44, a semi-circular cover 45 is placed in order to cover a gap between the head 2 and the moving member 39. Sector gear 43, installed on one side of the sector shaft 42, is mutually engaged to the spear gear 46 which is provided on the shaft of a motor shaft M5. This mechanism is to control the tilting movement of the head portion 2 as the sector gear 43 rotates according to the rotation of motor M5.

Figure 10:
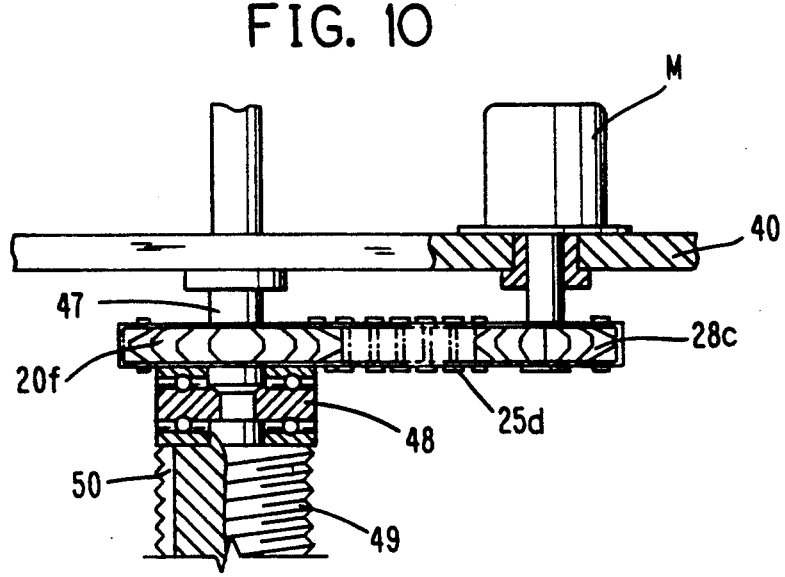
FIG. 10 is an enlarged cross-section view of part of the drive mechanism.
Figure 11:
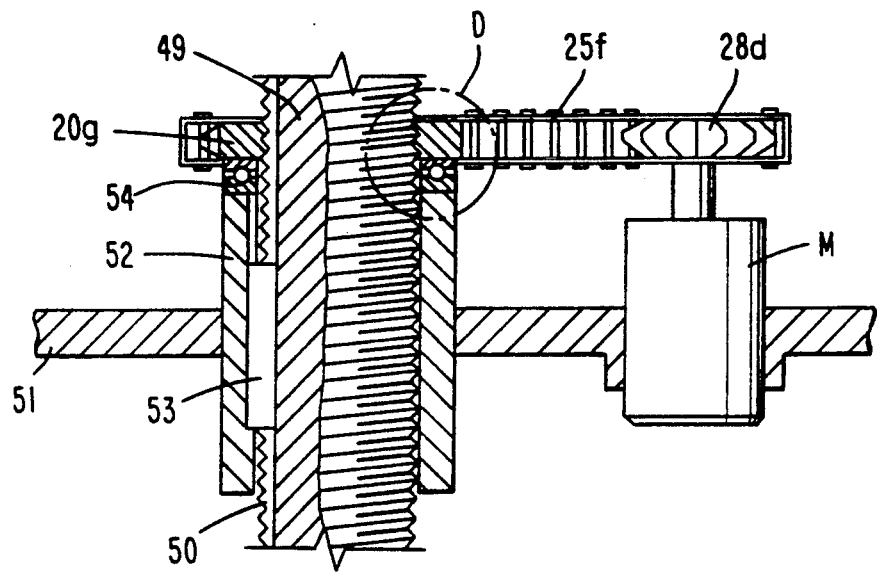
FIG. 11 is an enlarged cross-sectional view of the up and down driving mechanism.
Figure 12:
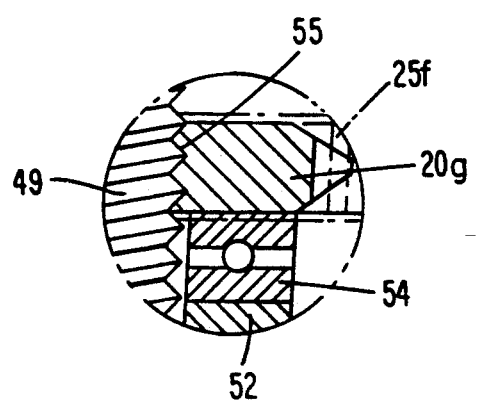
FIG. 12 is an enlarged cross-sectional view of portion D of FIG. 11.

Also, on one side of the moving member 39 inserted between the head and the body portion of the moving TV receiver another motor M6 is installed facing downward. A small sprocket 28c is fixed to the end of the motor shaft where it protrudes from the lower side of the fixed member 40. At the center of the lower side of the fixed member 40, a fixed shaft 47 is formed. A sprocket 20f on one end of the shaft is linked to the small sprocket 28c by chain 25d. As shown in FIG. 10, a double-row thrust bearing 48 is installed on the lower half of the fixed shaft 47. Below this structure, a screw shaft 49 is suspended for free rotation. On the screw shaft 49, which can separately operate with the help from the double-row thrust bearing 48 along with the fixed shaft 47, a key home 50 as illustrated by the FIG. 11 and 12 is formed on the lower portion of the space room 4 and inserted in the fixed bushing 52 which is installed at the center of the supporting member 51. Between the screw shaft 49 and the fixed bushing 52, the keyway 50 is provided with a key (not shown) which will guide the up and down movement of the screw shaft 49.

A fixed bushing 52 is integrally formed with the screw shaft 49 at the center of the fixed member 40 in the moving member 39. On the upper half thereof, a single row thrust bearing 54 is installed with its upper side provided with a sprocket 20g which forms a screw thread 55 that is connected to screw shaft 49 as shown in FIG. 12. This sprocket 20g is linked by a chain to the small sprocket 28d which is installed on motor M4 which is facing upward while installed on one side of supporting member 51. Thus, as the motor M4 revolves, the sprocket 20g on the screw shaft 49 rotates, enabling the screw shaft 49 to move up and down. Accordingly, the head portion 2 which is connected to the moving member 39 moves up and down.

On both sides of the upper half of the moving member 39 and of the supporting member of the space 4 which contains the moving elements inside it, limit switches LM5, LM6, LM7, LM8 are installed to control the range of the tilting angle and height of up and down movement of the head portion 2.

Following hereinbelow is a description of how to operate the present invention.

When the viewer intends to move the moving TV receiver while watching the TV, the viewer can turn on the power key on the TV receiver. Then, a start signal "H" sent by a motor interrupt port interrupts the electric power that is supposed to go to the motors M1, M2 and M3 respectively. As the next step, a relay (Ry1) coil of the motor interrupt driven portion A10 is excited, closing the related contacts "a1" and "a2." See FIG. 19A-19C. Here, the electric power stays on the contact "a" which is commonly shared by A11, A12, A13. The same power also stays on the No. 1 pin commonly shared by the speed controllers SC1, SC2 and SC3.

Figure 19A:
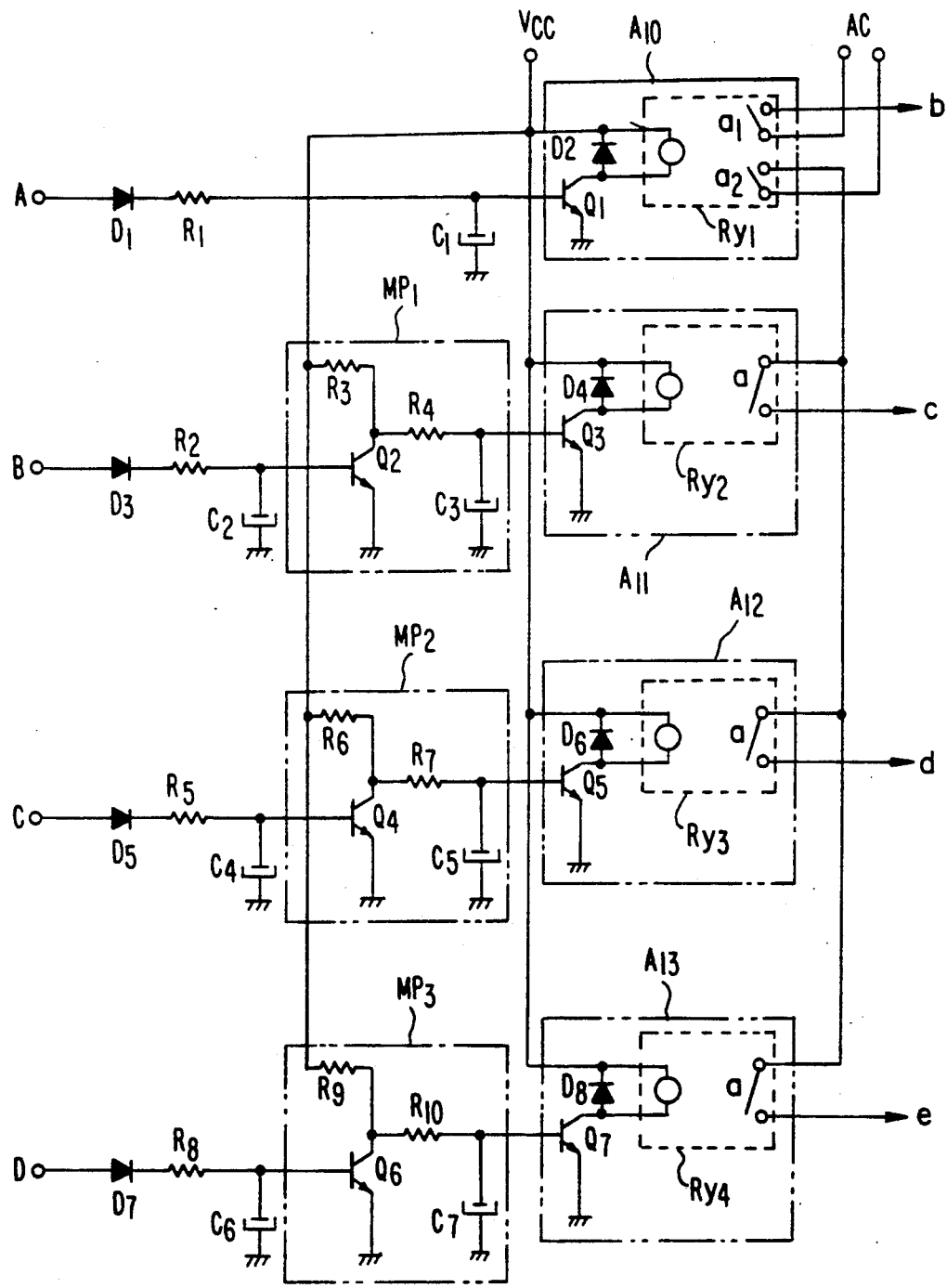
FIGS. 19A-19C are illustrations of the control circuit.
Figure 19B:
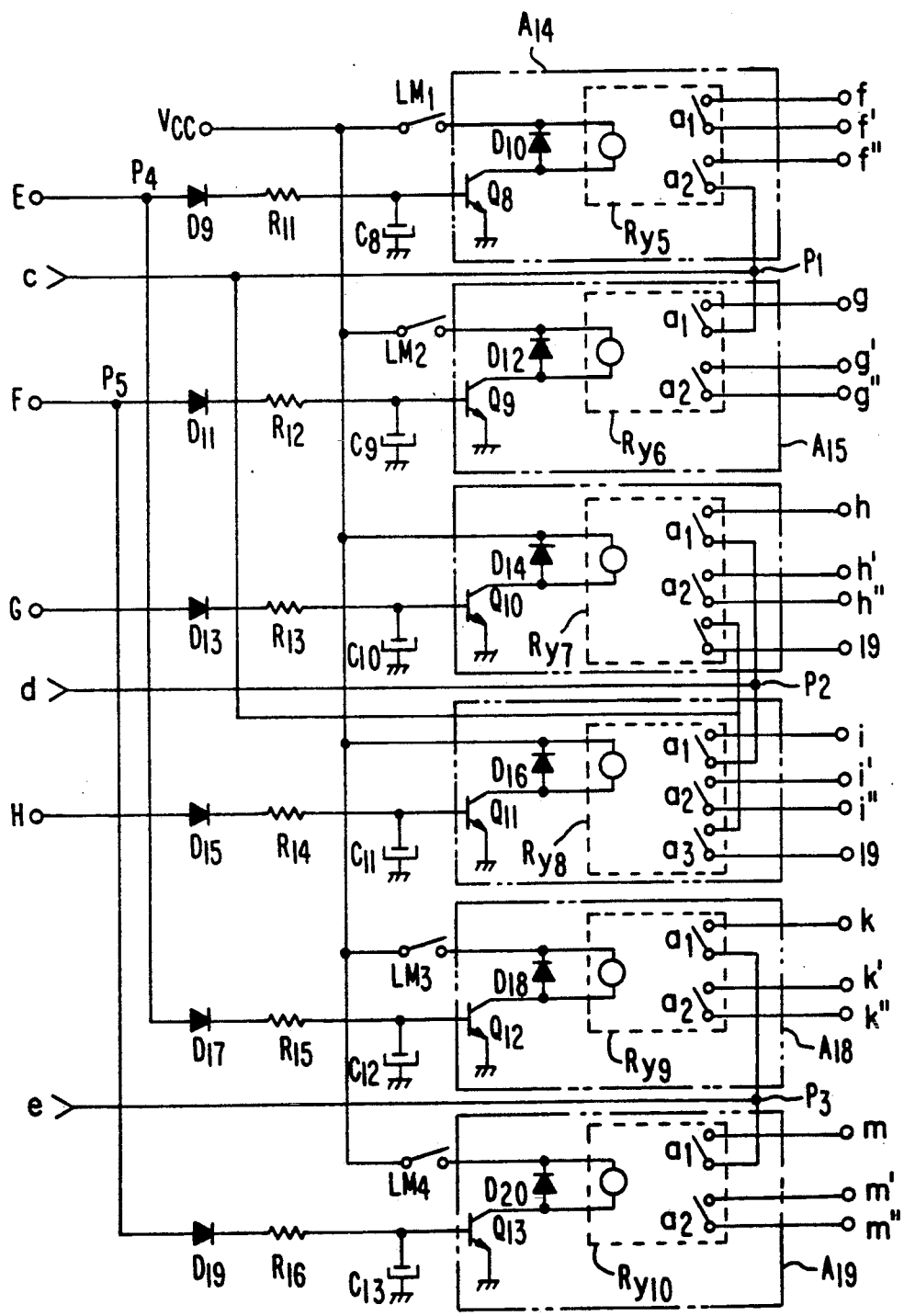
Figure 19C:
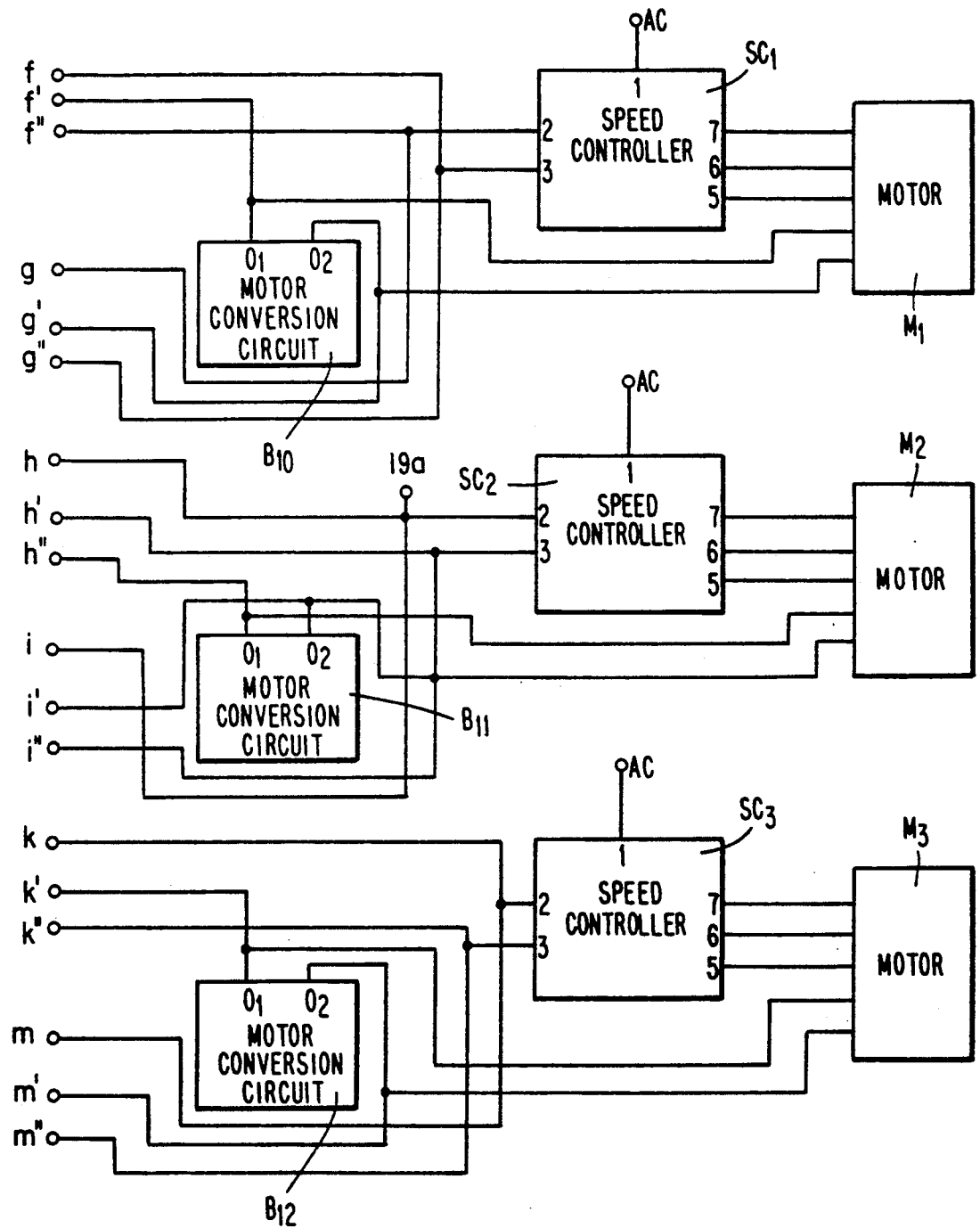

As it is, when the viewer (user) pushes the mode selection button 57', which directs back and forth movement of the TV receiver 1, the signal as shown by FIGS. 19A-19C is sent to the transistor Q4 via diode D5, resistance R5 and condenser C4 from micom output port C. Simultaneously, a separate power flow Vcc is sent to Q4 and Q5 via R6 and R7, becoming equipotential to the previously mentioned power. Then, the signal excites the Ry3 coil at the motor driven portion A12. At the same time, the contact "a" at Ry3 is closed, sending an alternating current (AC hereinafter) to the contact "a" of battery driven relays (Ry7) and (Ry8).

If the viewer pushes the button (v) among the movement selection buttons:(>) (<) (v) ( ), the signal decided by the output port G excites the Ry7 coil, closing the contacts a1, a2 and a3. See FIG. 13A. The same power through a1 is sent to the board 2 of the speed controller Sc2 and the clutch 19a. The power adjusted by the variable resistance inside the Sc2 is sent to the terminal 01 at the motor switching circuit B11 by way of the contact a2, causing the shaft of motor M2 to rotate (turn). This motor shaft of M2 is linked to the sprocket 20b to the transmission shaft 23 and is fixed to the lower side of the fixed frame 16 of the space room (4). At the same time, the magnetic clutch 19 on the driving shaft 22, 22' is provided with power while the magnetic clutch 19a on the transmission shaft 23, 23' is set off by power provided by the contact of Ry7. In this way, the turning of the motor M2 is sent to the sprocket on the transmission shaft of the fixed frame 16 through chain 25a, allowing the transmission shaft 23 and the driving sprocket 20a to turn accordingly. The driving shaft 22 revolves as the driven sprocket 20 connected to the sprocket 20a revolves. The other driving shaft, 22', turns in the same direction with the driving wheels 10, 10' on the ends of driving shafts 22, 22', allowing the entire receiver 1 to move forward as illustrated in FIG. 17.

The viewer can release the movement selection button (v) when the receiver has moved as he/she desired. Then, the signal from the micom output port G is inverted, disconnecting the AC power which is being sent to the motor M2. When the motor M2 on the fixed frame 16 stops operating, receiver 1 also stops moving, with clutch 19a being able to connect the separated transmission shafts 23, 23'. Conversely, when the viewer intends to move the receiver backward while the multiplexer MP2 and the motor-driving portion A12 are operated by the control signal from the micom output port C, he/she can push the button ( ), which will be sent to the transistor in the relay driving portion A17 for direction switching mode by way of D15, R14 and C11. In the mean while, the relay Ry8 is excited by the independent power Vcc, and the contacts a1, a2 and a3 are closed. The AC power through a1 is sent to the pin No. 2 of Sc2 and the magnetic clutch 19a. The power readjusted by the variable resistance within the speed controller is again transmitted to the reverse terminal 02 and then to the motor M2.

Contrary to the movement mentioned above, the motor M2 installed on the upper side of the fixed frame 16 counter-revolves while the clutch 19 of the driving shafts 22, 22' drives them as one shaft so that power transmission is made possible. Clutch 19a on one side of transmission shafts 23, 23' separates the shafts with magnetic repulsion, sending the counter revolving motion of the motor M2 to the sprocket 20b installed on one end of the transmission shaft 23 through the chain 25a. As transmission shaft 23 rotates, the other sprocket 20a on the same transmission shaft 23 counter-revolves. Then the driving sprocket 20 on the driven shaft 22, linked to the above-mentioned sprocket by the chain 25, rotates and causes driving shafts 22, 22' to rotate in the opposite direction.

Figure 17:
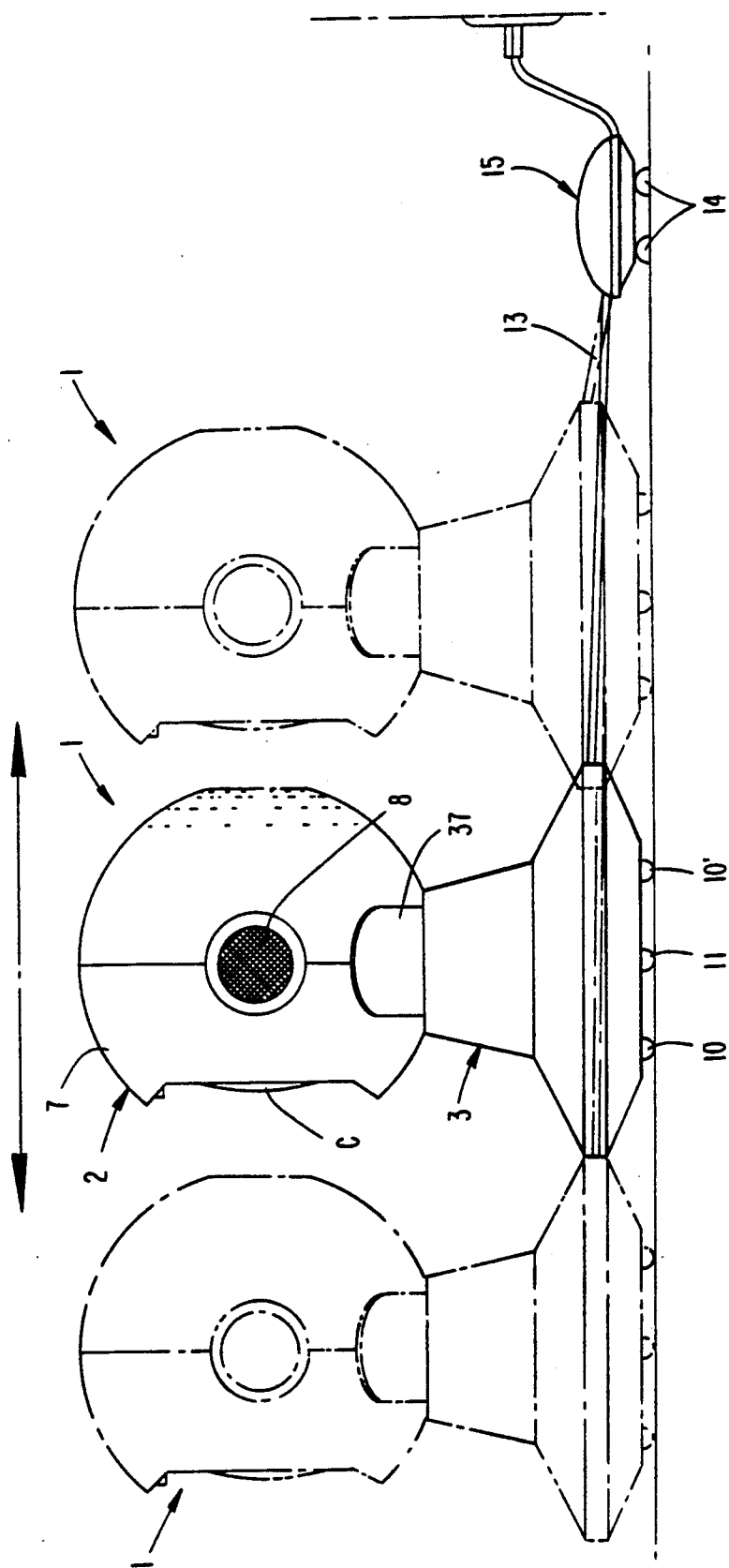
FIG. 17 is an illustration showing the turning movement of the moving television receiver.

When the driving shafts 22, 22' are united as one by the clutch 19, they turn in the same direction as the transmission shaft 23, which in turn operates the driving wheels 10, 10', allowing the receiver 1 to move backward as shown in FIG. 17.

When the viewer releases the direction selection mode button ( ), the signal from the micom output port H is inverted, disconnecting the AC power which is being provided to motor M2 while the contacts a1, a2 and a3 of the relay driving portion A17 and relay Ry8 open.

Likewise, the receiver 1 stops moving backward while at the same time the other transmission shaft 23' which was separated from the shaft 23 become united therewith.

When the user intends to move the receiver to the right while the motor interrupt driving portion A10 together with the multiplexer Mp2 and the motor driving portion A12 are normally operating by the control signal from the micom output port C, he/she can push the selection button 57' for right and left movement. The signal is sent to the transistor base [2] at the multiplexer through the diode 3, [3], resistance [2] and condenser [2], starting from the micom output port B. ([ ] is not shown).

Simultaneously, an independent power (Vcc) is sent to the transistor [2] and [3] via the resistance [3], [4], keeping them equipotential to each other. Then the inverted signal excites the relay Ry2 coil of the motor driving portion 11.

Here, the contacts a1 and a3, which are for direction selection mode, are provided with the same signal, as the contact "a" at the relay Ry2 is closed.

In order to move the receiver to the right, the viewer can push the selection mode button (>) out of the four selection modes (v) (<) ( ) (>). Then, the signal from the micom output port G is sent to the driving portion (A16) through D13, R13 and C10.

At the same time, the relay Ry7 is activated, closing the contacts a1, a2 and a3.

When the contact "a" at the relay Ry2 is closed, the AC power from the contact "a" at the Ry7 is transmitted to the magnetic clutch 19, producing magnetic repulsion.

However, since the relay driving portion A17 is in a passive state, contact a3 at Ry8 remains off, while the clutch 19 is united by the magnetism, connecting the transmission shafts 23 and 23'.

As the contact a1 at Ry7 is closed, the AC power from the same contact is sent to the pin No. 2 of the speed controller SC2. At the same time, the power which was varied by the variable resistance inside SC2 is transmitted to the terminal 01 and finally to the motor M2.

Then, the motor M2 which was installed on the upper portion of the fixed frame of the space room 4 separates the driving shafts 22, 22' by the inside circuit control. Union of the magnetic clutch 19a on the transmission shaft 23, 23' sends the rotating motion of the motor M2 to the transmission shaft 23, 23' throughout the chain 25a. As the shafts 23, 23' turn, the driving sprocket (20a) on the same shafts also turns, driving the vertical sprocket 20 which is liked to it by chain 25. Finally, the rotation of the driving shaft 22 causes the driving wheel 10 to turn clockwise.

The rotation of the transmission shaft 23 is sent to the driving gear 24 by way of clutch 19a, counter-rotating (counter clockwise) the driven gear on the driving shaft 22' which is mutually engaged to the driving gear 21. A the driving shaft 22' and driving shafts 23, 23' turn in the same direction, the driving wheel on other end rotates counter clockwise. The driving wheels on the driving shafts 22, 22', which are divided by clutch 19, rotate in opposite directions to each other, thus being able to turn 360° to the right, and the viewer can release the selection button (<) when he/she gets the angle he/she desired.

Accordingly, the signal to the micom output port G interrupts the movement of the relay driving portion A16 for selection mode. When the viewer pushes the button (V) again, the signal from the micom output port B orders the motor driving portion A11 to stay in a passive state, turning off the power which was provided to the contact a3 at the Ry7, Ry8.

Figure 18:
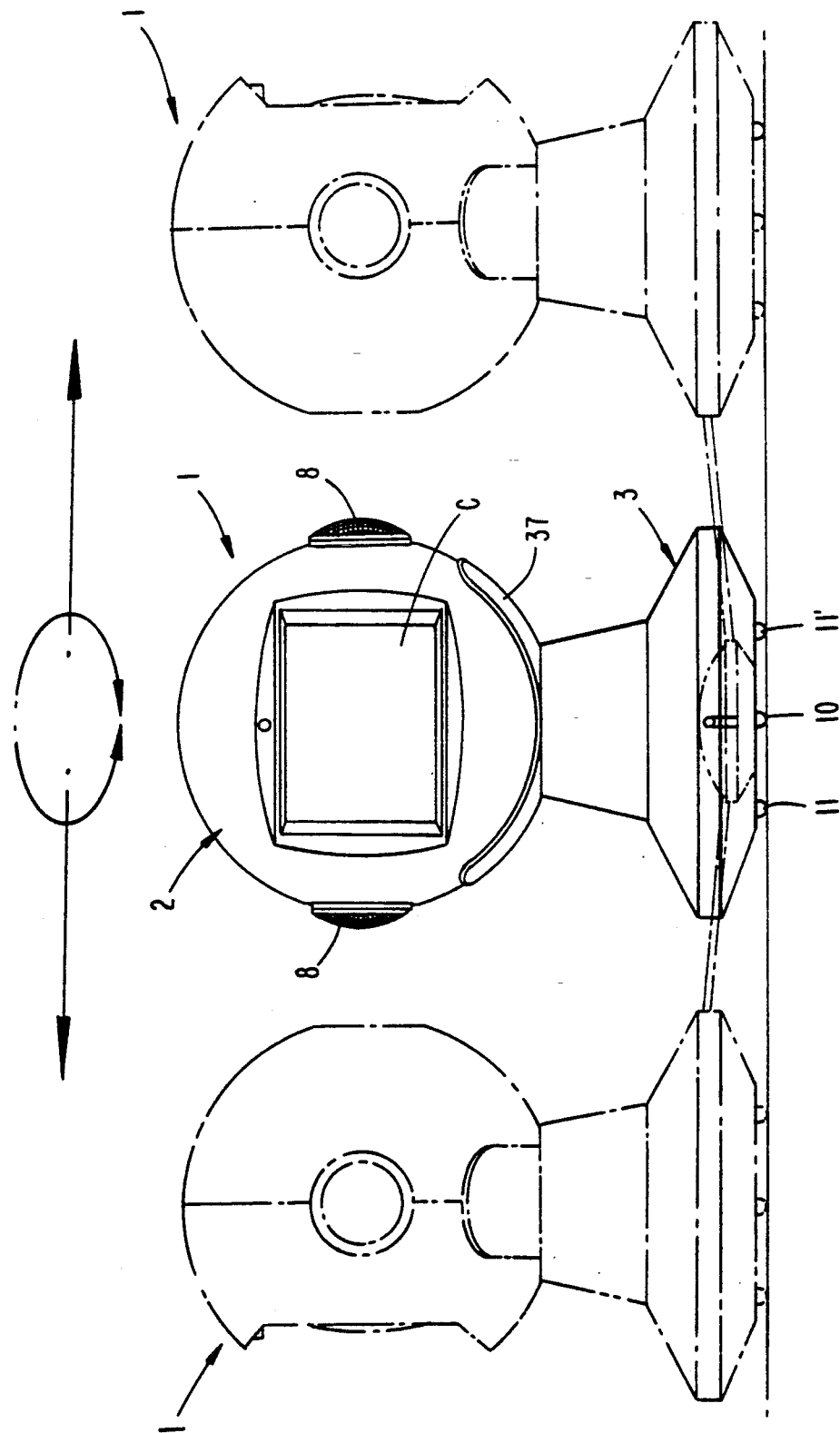
FIG. 18 is an illustration showing the left and right turning movement of the moving television receiver.

When the viewer pushes the selection button (v) again, repeated movement of the Ry7 of the relay driven portion (A16) for selection mode allows receiver 1 to move forward simultaneously as it turns to the right, resulting in movement to the right as shown by FIG. 18.

When the viewer releases the selection button (v) after the TV receiver 1 has moved as he/she desired, the signal from the micom output port G is inverted as mentioned earlier, disconnecting the AC power which is being sent to the motor M2 with the contacts a, a' at Ry7 remain open. This is followed by the interrupted movement to the right of receiver 1 and, by clutch 19 on the shafts 22, 22', return to its previous state.

Also, contrary to what is mentioned above, when the viewer intends to move the receiver to the left, he can select the panning selection mode 57' and the power is provided to the contacts a3 at Ry7, Ry8 by the operation of the motor driving portion A11 and the relay Ry2. Afterward, when he/she pushes the button (<), the signal from the micom output port H is sent to the relay driven portion for selection mode through D15, R14 and C11, closing the contacts a1, a2 and a3 with the relay (Ry8) coil being excited by independent power Vcc.

The AC power from the contact a1 is sent to the pin No. 2 of the speed controller SC2 while the power adjusted by the variable resistance inside the speed controller SC2 is transferred to the reverse terminal 02 and then to the above mentioned motor M2 through the contact a2 at Ry8.

Then the motor starts turning in the reverse sense. Thus, the motor M2 provided with the transmission shafts 23, 23' installed in the upper side of the fixed frame 16 of space 4 also counter-rotates with the driving wheel 10 on the driving shaft 22 turning counter-clockwise. In the meantime, the other driving shaft 22' and wheel 10, turn clockwise so that receiver 1 itself turns 360° to the left. When the viewer releases the selection button (<) after receiver 1 reaches the desired angle he/she desires the signal from the micom output B makes the motor driving portion all to stop all its movement.

In this way, the power sent to the contact a3 at Ry8 of the relay driving portion A17 for selection mode is turned off. At the same time, the inverted signal from the micom output port H keeps the relay Ry8 at the relay driving portion for selection mode and also remains in a passive state.

When the viewer pushes the button for upward movement, the signal from the micom output port H activates the relay Ry8 of the relay driving portion A17 for backward movement, enabling the head portion 2 which is turned to the left to start moving back, finally allowing the receiver itself to move to the left as shown by FIG. 18.

When the viewer releases the selection button (<) as receiver 1 moves in the direction (to the left) as he/she desires, the inverted signal from the micom output port opens up the contacts a, a' at Ry8, interrupting the AC power being provided to the motor M2.

In order to turn receiver 1 to face forward, the viewer can push the button (<)(>) for selection mode on the remote control (56), and receiver starts turning left and right.

With the receiver turned 90° to be facing the front side, releasing the direction button (<) (>) fixes the receiver to the front side.

As described above, at the time of the receiver's movement the power cord or cable 13 connected to the receiver is automatically wound or unwound in proportion to the receiver's movement by the winding machine on the floor and the power cord 13 is simultaneously and automatically positioned.

The length of power cord 15 is optionally set in accordance with the maximum moving range of the receiver and is wound with the winding machine for use.

Figure 13:
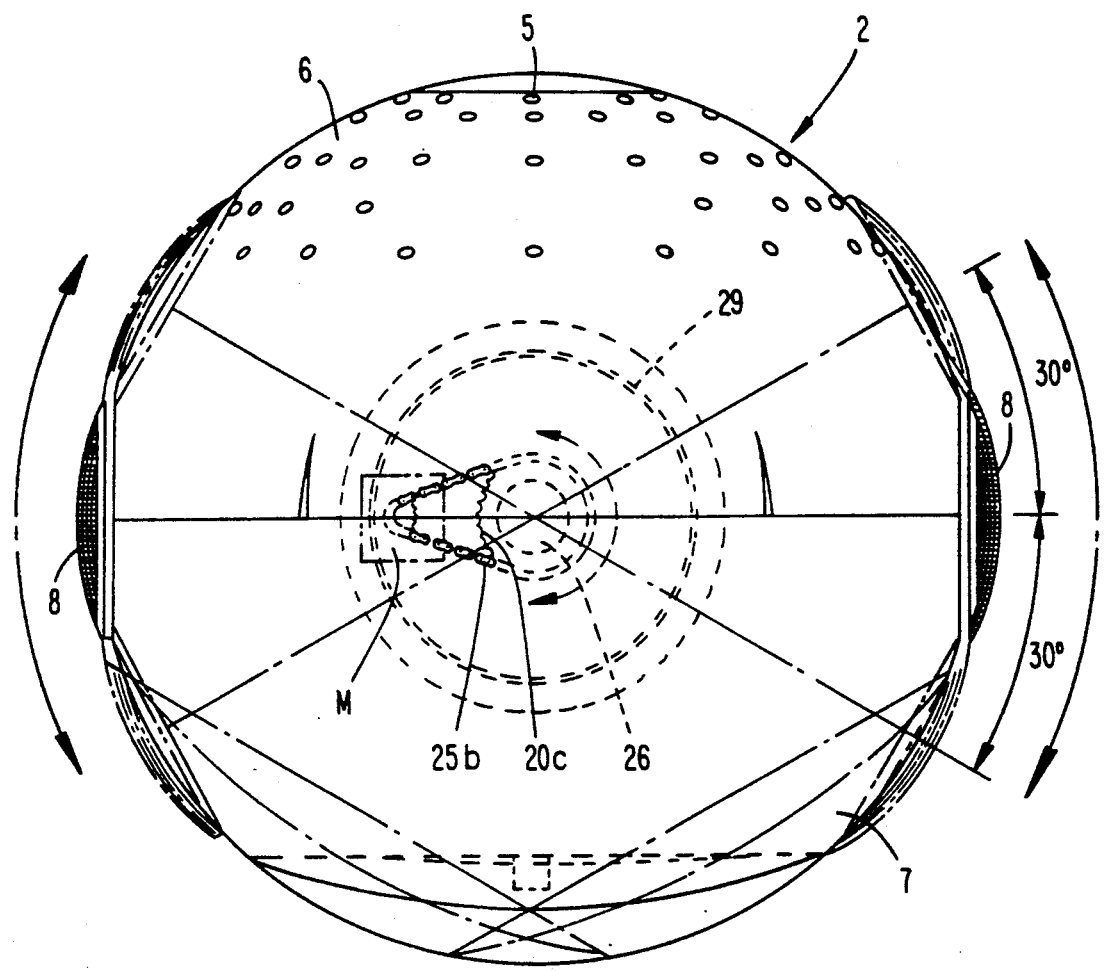
FIG. 13 is a plan view showing details of the left and right turning movement of the head portion.

Another preferred embodiment will now be described. In order to move the head portion 2 to the left or the right for the viewer's visibility, he should press the visibility control motor selection button 57" as shown in the illustration FIG. 13 among those mode selection buttons 57, 57', 57''' of the remote control 56. See FIG. 13A. The signal is transmitted to the multiplex PM3 through the diode D7, resistance R8 and the condenser C2 at the unillustrated output port of the micom.

At the same time, a separate flow of electric power (Vcc) is transmitted to the transistor Q7 of the motor-driving portion A13 through resistance R9, R10, to secure the same-level electric potential and to reverse the signal and to excite the relay Ry4 coil of the motor driving portion A14.

Then the contact point "a" of this relay Ry4 is closed and the AC power is induced to the relay Ry5 contact point a2 of the driving portion A14 for selection of direction and to the relay Ry6 contact point a1 of the driving portion A18, A19 for selection mode.

Thereafter, pressing the direction button for the right (>) among the direction buttons (<)(>)( )(v) of the remote control 56 transmits the power to the transistor Q13 of the relay driving portion for selection of direction A15 from an output port F (not shown) of the micom through the diode D19, resistance R16 and the condenser C13. Hence, separate power (Vcc) is transmitted to the relay Ry10 coil through the limit switch LM2, and the coil is excited.

At the same time, the contact points a1, a2 are closed and AC power is transmitted through the contact point a1 to the No. 2 pin of the speed controller SC3. The power adjusted by the variable resistor (unillustrated) in the speed controller SC3 flows to the direction-reversing terminal 02 of the motor conversion circuit B12 through the contact point a2 of the above relay Ry10.

Motor M3, fixed at the fixing frame 16 of the upper portion of the vertical transmission shaft 23, 23' in inner space 4 of lower body portion 3 rotates clockwise, turning the small sprocket 28 stuck on the motor. Then, movable sprocket 20c of the vertical transmission shaft 26 installed on the footstep bearing 27 of the fixing frame 16's center-upper portion and linked with the small sprocket rotates clockwise and the vertical transmission shaft 26 also rotates.

Revolving disk 29 attached to the vertical transmission shaft 26 rotates and both of fixing members 30, 30' on disk 29 also rotate to turn the fixed disk 35 integrated in a single body on fixing members 30, 30' and attached to head portion 2 in the direction of movement of the vertical transmission shaft 26.

According to the movement of the fixed disk 31, only the head portion 2 of the receiver 1 rotates in the same direction, say to the right.

When head portion 2 moves as much as the viewer wants, he should release the direction button for the right (>) on the remote control 56. Then, motor 13 stops and head portion 2 is positioned as wanted.

Even though the viewer continues to press the direction button for the right by mistake, head portion 2 rotates no more than 30°. That is, in case the head portion 2 reaches the maximum turning position and the lower portion of the head portion 2 turns to the maximum, the limit switches LM3, LM4 installed at both sides in the lower portion of head portion 2 turn off, to end movement of the relays Ry9, Ry10 and to bring the motor M3 to a standstill.

Therefore, in spite of the viewer's mistaken continued pressing of the direction button 37' for the right on the remote control 56, the motor M3 is stopped by the limit switches LM3 LM4 installed in the lower portion of head portion 2 and the head portion 2 is controlled not to move beyond the maximum moving angle of 30°.

The above-described mechanism enables the head portion 2 of receiver 1 to be remote-controlled and to move to the right as far as the viewer wants within the range of 30°.

Likewise, when the viewer wants to move the head portion 2 of receiver 1 to the left, he should press the direction button (<) among the direction buttons (v) ( )(<)(>).

Then the signal from the output port (E) often micom activates the direction-selecting relay transmission portion A18 in the opposite way of the previous case and the power through the contact points a1, a2 turns the motor M3 anti-clockwise through the speed controller SC3 and the conversion circuit B12, which rotates the motor M3 above the fixing frame 16 in the inner space 4 of body portion 3 clockwise. It also rotates the fixing members 30, 31' and the fixed disk 35 anti-clockwise which, in turn, turns the head portion 2 to the left.

When the head portion 2 has moved to the left properly for visibility, the viewer should release the direction button (<) of the remote control 56, which stops the motor M3 and the movement of the head portion 2. In that way, head portion 2 moves to the left for the viewer's visibility within the range of 30°.

Accordingly, the head portion 2 of receiver 1 moves freely to the right or left within the maximum range of 60° by the remote control, to secure the viewer's visibility.

Figure 13A:
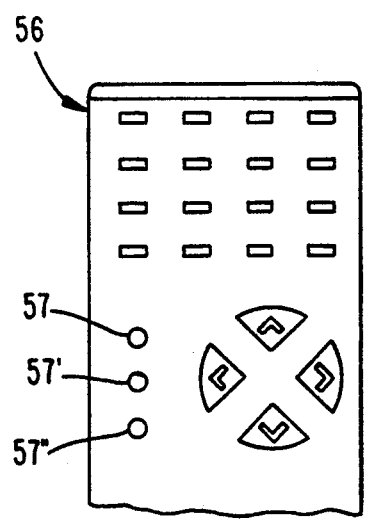
FIG. 13A is a plan view of a remote control element that may be used to control the receiver.
Figure 14:
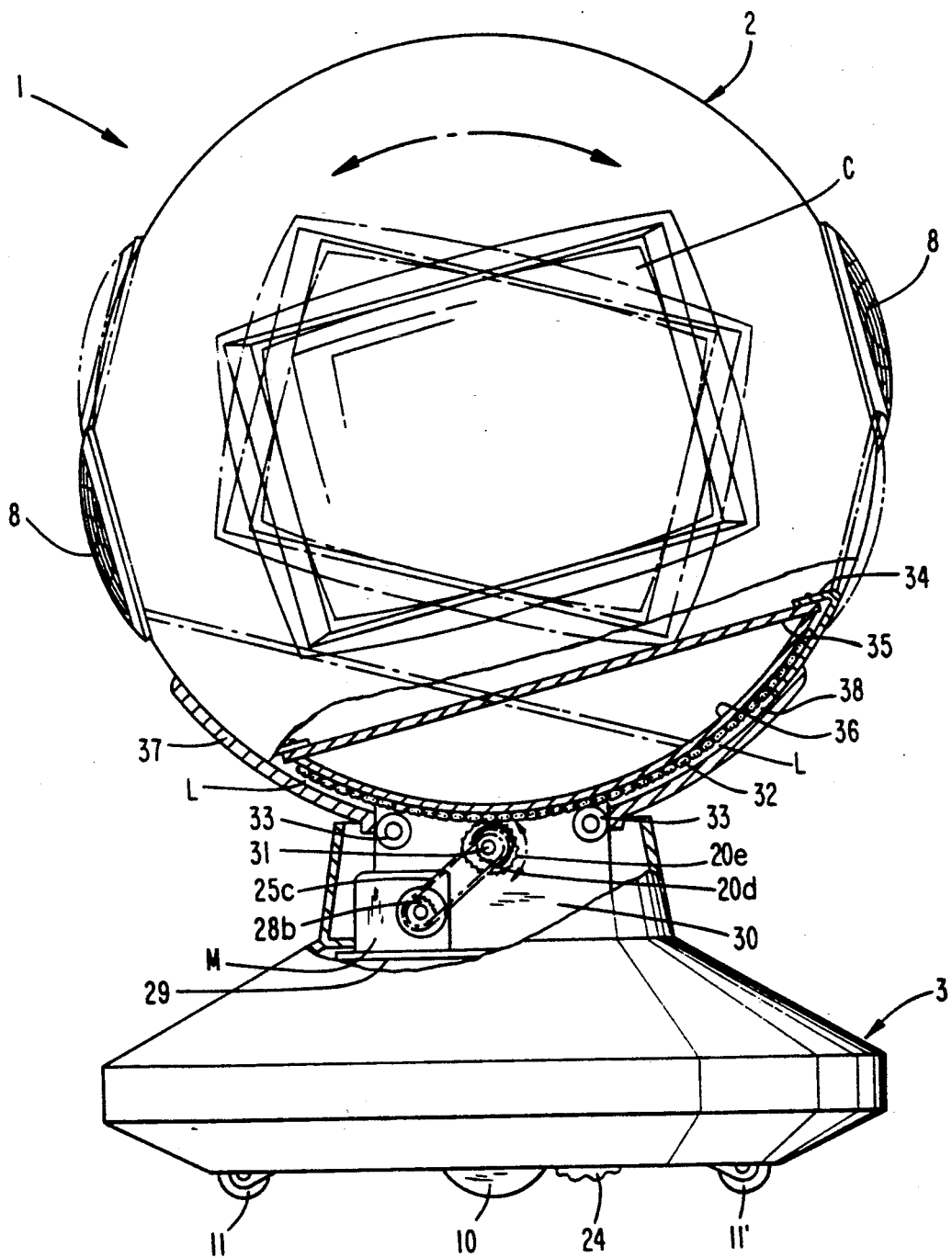
FIG. 14 is a front elevation view of the receiver to illustrate details of leaning adjustment of the head portion.
Figure 15:
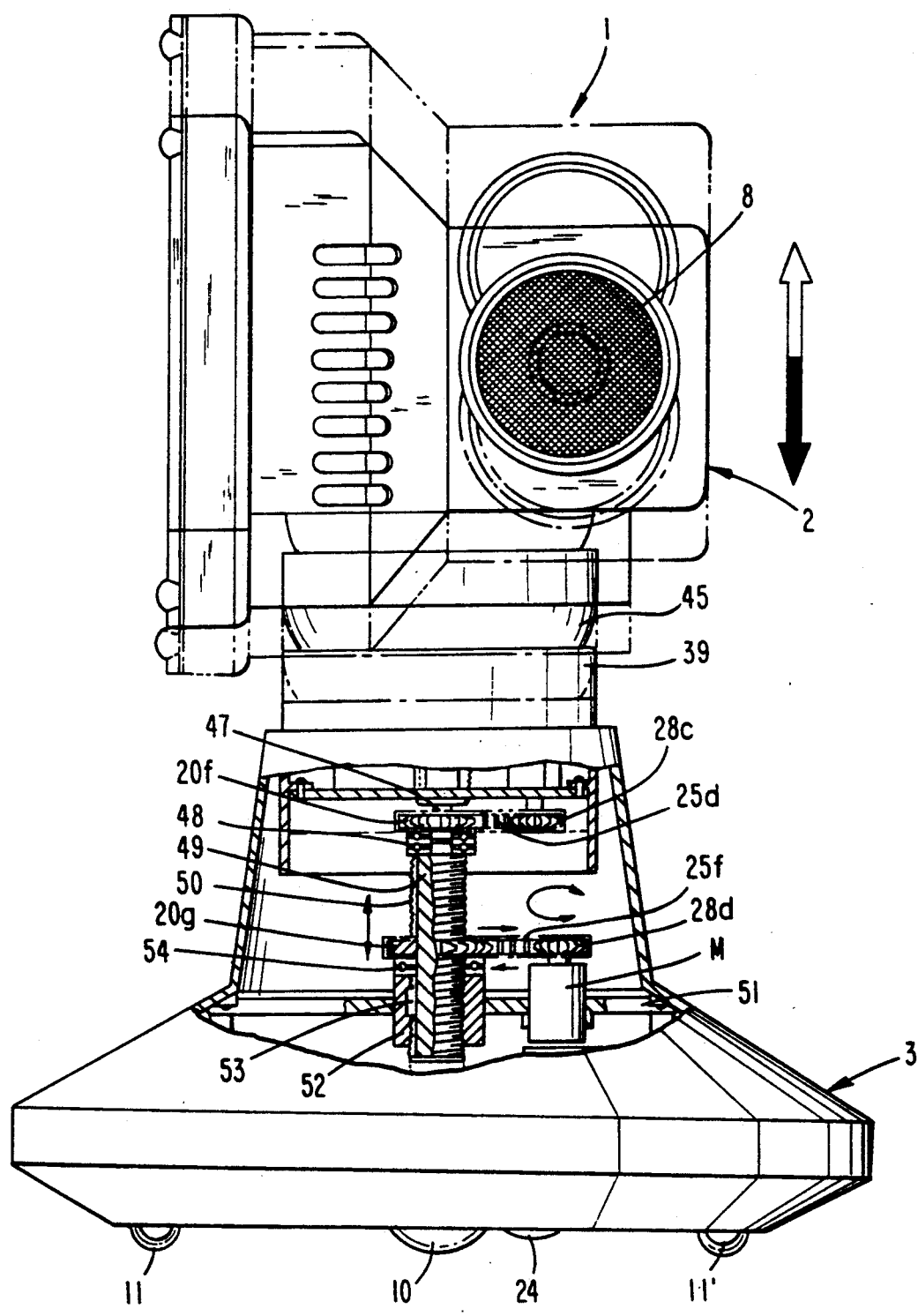
FIG. 15 is a partial sectional side-view showing height adjustment elements of the head portion.

A third embodiment is described hereinbelow. When the viewer wants the head portion 2 of the receiver 1 to lean toward the right or left during watching of the television, he should press the inclination button 57, the lowest of the mode selection buttons 57, 57', 57" as shown in FIG. 13A. With that action, the mode selection is transmitted to the multiplex MP1 at an output port B (not shown) of the micom through the diode D3, resistance R3, R2 and the condenser 2.

At the same time, a separate power (Vcc) is transmitted to the transistor Q2 through resistances R3, R4 and transistor Q3 of the motor transmission portion A11, to make the potential thereof the same and to reverse the signal, which excites the relay Ry2 coil of the motor driving portion A11.

Then, the contact point a2 of the relay Ry2 is closed and the waiting AC power is induced to the relay Ry5 contact point "a" of the direction-selecting relay driving portion A14 and to relay Ry6 contact point "a" of the direction selecting relay driving portion A15.

At this moment, if the viewer presses the direction button to the right (>) among the direction buttons (<) (>) ( ) (v), a signal is transmitted to the transistor Q9 of the direction-selecting relay driving portion A15 from the unillustrated output port F of the micom through the diode D11 resistance R12 and the condenser C9, while separate power (Vcc) is transmitted to the relay coil Ry16 through the limit switch LM2.

Then, the coil Ry16 is excited and, simultaneously, the contact points a1, a2 are closed. The power through the contact points a1 is transmitted to the pin No. 2 of the speed controller SC1 and the power adjusted by the unillustrated variable resistance in the speed controller SC1 flows to the direction-reversing terminal 02 of the motor conversion circuit B10 through the relay Ry6 contact point a2 and is transmitted to motor M1.

Motor M3, fixed at the revolving disk 29 of the upper portion of the transmission shaft 26 in the inner chamber of lower body portion 3 rotates anti-clockwise, and sprocket 20d installed on the revolving shaft 31 and chain-connected with the sprocket turns, which rotates the sprocket 20e on the shaft anti-clockwise.

Then, engaging with the sprocket 20e turning anti-clockwise, the chain rack 32 integrated in a single body at the bottom side of the fixed disk 35 of the lower portion of head portion 2 moves in engagement with sprocket 20e and rotates to the left, which makes the head portion 2 lean toward the right side and rotate.

As this juncture, the round-type supporting members 36, 36' of the fixed disk 35 adjoins and moves among the revolving rollers 33, 33', 33", 33"' on the lower fixing member 30, 30', as shown in the illustration FIG. 2. This prevents the fixed disk 35 from rattling during turning of the leaning head portion 2 for a smooth movement, and also acts as a sliding guide for the fixed disk 35.

When head portion 2 has leaned toward the right side as much as the viewer wants, releasing of the direction button (>) of remote control 56 reverses the signal from the output port of the micom, to open contact points a1, a2 of the direction-selecting relay driving portion a15 and the relay Ry6 and to cut the AC power to the motor M1.

With stoppage of the motor driving, further leaning of the head portion 2 is brought to a standstill to ensure an appropriate leaning of the head portion 2 of the receiver 1 at an angle the viewer needs.

However, even if the viewer happens to press continuously on the direction button (>) of the remote control by mistake, the head portion 2 leaning cannot exceed 20° (the range of this maximum angle can be modified by the position of the limit switches), for there are installed limit switches LM1, LM2, at a distance from each other, inside the supporting cover 37.

In case the head portion 2 has leaned as far as the designated angle 20, the head fixed disk 35 touches the limit switch LM2 and cut the power to the relay Ry6 coil by movement of the limit switch LM2, regardless of continued pressing of the direction button (>) of remote control 56.

Consequently, the motor stops owing to the lack of power, and the head portion 2 of the receiver 1 is controlled not to lean in excess of 20 to the right.

However, repositioning the limit switches LM1, LM2 installed on the supporting cover 37 allows a leaning range of 20°-60° to the right and the viewer may watch the television leaning within that range.

Likewise, when the viewer wants to have the head portion 2 of the receiver 1 lean toward the left side at a certain angle, he should press the inclination button 57', and the direction button to the left (<) together. Then, the signal is transmitted to the transistor Q8 of the direction-selecting relay driving portion A14 from an output port E (not shown) of the micom through the diode D9, resistance R11 and the condenser C8, while separate power (Vcc) is transmitted to the relay (Ry5) coil through the limit switch LM1 and the coil is excited.

At the same time, contact points a1, a2 are closed and the AC power through the contact point a1 is transmitted to the No. 2 pin of the speed controller SC1. The power is adjusted by a variable resistor (not shown) in the speed controller SC1 and flows to the same-direction terminal 01 of the conversion circuit B10 and is transmitted to the motor M1.

Concurrently, the motor M1 fixed on the revolving disk 29 of the upper portion of the vertical transmission shaft 26 in the inner space 4 of lower body 3 rotates clockwise unlike the previous case, and the turning of motor M1 is delivered to the chain rack 32 at the bottom of disk 35 at the bottom of head portion 2 through small sprocket 28b, chain 25c and the sprocket 20d installed in revolving shaft 31 between the two fixing members 30, 30' integrated with the revolving disk 29 of vertical transmission shaft 26. Chain rack 32 turns and moves to the right following the turning of sprocket 20, which results in head portion 2 leaning to the left and rotating.

When the head portion 2 has leaned as much as the viewer wants, he releases the direction button (<) of the remote control 56. Then, the signal from the output port E of the micom is reversed, which opens the relay Ry5 contact points a1, a2 of the left driving portion 14 and cuts the AC power to the motor M1.

Consequently, it stops driving of motor M1 and further leaning of the head portion. The viewer may thus watch the television with head portion 2 leaned to the left at an angle wanted by the viewer.

In this case, the maximum range of the leaning of head portion 2 does not exceed the optionally designated angle controlled by the limit switch LM1 fixed on the supporting cover.

Meanwhile, the movement of the motor on-off driving portion A10 is obtained by pressing the motor on-off button 57', of the remote control 56. It excites the relay Ry1 coil of the motor on-off driving portion A10 by a signal from the output port "a" of the micom and the AC power is supplied to each motor driving portion A11, A12, A13.

Under these conditions, the motor mode selecting buttons 57, 57', 57" and the direction buttons (<) ( ) (v) (>) of the remote control are used to control each motor driving system of receiver 1.

Releasing of the motor on-off button 57 of remote control 56 stops the function of the relay Ry1 coil to the motor on-off driving portion A10, which cuts the AC power being supplied to each motor driving portion A11, A12, A13.

The other functions of this invention are as follows.

First embodiment

When the viewer wants to watch the television from above the screen-level or from under the screen-level for which the head portion 2 of the receiver 1 with the CRT tube C should be lowered down, he should press the height-adjustment mode selecting button 57 among the mode-selecting buttons 57, 57', 57" of the remote control 56 for a mode selection and press the up-direction button ( ) among the direction buttons (<) (>) ( ) (v) of the remote control 56 for lifting the head portion 2 of the receiver 1.

Motor M4 on the support member 51 on the fixing frame 16 in the lower portion of the inner space 4 of the receiver body portion 3 then turns to the left and the small sprocket 28d on the shaft turns in the same direction. But the screw shaft 49 connected therewith by chain 25f and put in engagement with screw thread 55 inside of the large sprocket 20g on the sliding screw shaft 49 does not turn, while only the sprocket 20g turns to the left together with the single-row bearing 54.

In this way, screw shaft 49 is lifted in gear with the screw thread 55, without turning, just like a nut being screwed into a fixed bolt.

At this time, the keyway 50 of the screw shaft 49 is guided, slides along and is lifted at the key 53 inside the fixing bushing 52.

As the upper end of the screw shaft is fixed at the fixing member 40 in the drum-type moving member 39 together with the double-row thrust bearing 48 and the sprocket 20f, the screw shaft 49 is lifted with the whole drum-type moving member 39 and is fixed in the upper portion by the sector arms 41, 41' on the drum-type member 39.

Thereafter, it is lifted with connecting frame 44 on a sector gear 43 fixed at the bottom of the fixed rib 34 under the head portion 2 and with the semi-circular cover 45.

As a result, the head portion 2 of the receiver 1 is moved upward.

When the head portion 2 of the receiver 1 has moved upward as much as the viewer wants, releasing of the direction button ( ) of the remote control 56 stops the motor M4 on the support member 51 at the bottoms of the inner chamber 4 of the body portion 3 under built-in circuit control and the upward-moving of the screw shaft 49 stops, which, in turn, stops that of the head portion 2.

Likewise, when head portion 2 of receiver 1 should be lowered down, the viewer should press the down-direction button (v) among the direction buttons ( ) (v) (<) (>) of the remote control 56.

Unlike the previous case, the motor M4 on the support member 51 fixed at the upper side of the lower fixing frame of the inner chamber is turned to the right, which rotates to the right the sprocket 20g of the sliding shaft 49, connected thereto by chain 25f and installed at the fixing bushing 52 at the center of the support.

Here, the screw shaft 49 goes into engagement with screw thread 55 inside the sprocket 20g and remains unturned. Only the sprocket 20g rotates to the right with the single-row thrust bearing 54.

Consequently, just like a nut being unscrewed out of a fixed bolt, the screw shaft 49 remains unturned by the turning movement of the screw thread 55 in engagement inside the sprocket 20g and is lowered down by the turning movement of the sprocket 20g.

The screw shaft 49 slides down along the key 53 in the fixing bushing 52 and is fixed at the top of the screw shaft 49, while fixing member 40 fixed in the drum-type moving member 39 moves down. As the connecting frame 44 on sector gear 43 connected at the fixed rib 34 under the head portion 2 is fixed in as a single body by the sector arms 41, 41' on the fixing member 40 linked with the screw shaft 24, the screw shaft 49 moves down together with the drum-type moving member 39, and head portion 2 is lowered down. As a result, head portion 2 of receiver 1 moves down.

When the time the head portion 2 has moved down as low as the viewer wants, he releases the direction button (v) of the remote control. It stops the motor M4 on the support member 51 at the bottom of the inner chamber 4 which, in turn, stops the turning of the sprocket 20g on the screw shaft 49 linked to the small sprocket 28d on the motor M4 by chain 25f. Thus, the moving-down of the screw shaft is completed and head portion 2 of receiver 1 moves no more.

As above, the head portion 2 moves up and down by remote control within a maximum range height-adjustment range of 200 mm. Even if the viewer keeps the direction buttons ( ) (v) pressed beyond a proper adjustment by mistake, the drum-type moving member 39 touches limit switches LM5, LM6 installed top and bottom inside body portion 3 between the support member 51 in the body portion 3 and the drum-type moving member 39, when head portion 2 is moving upward or downward to the maximum range of 200 mm. The motor (M4) on the support member (51) in the inner space 4 stops under the built-in circuit control through the movement of the limit switches, to keep head portion 2 from moving upward or downward in excess of 200 mm.

As described above, the viewer may optionally adjust the height of the head portion 2 within the maximum range of 200 mm through remote-controlling for a better convenience.

Second embodiment

Figure 16:
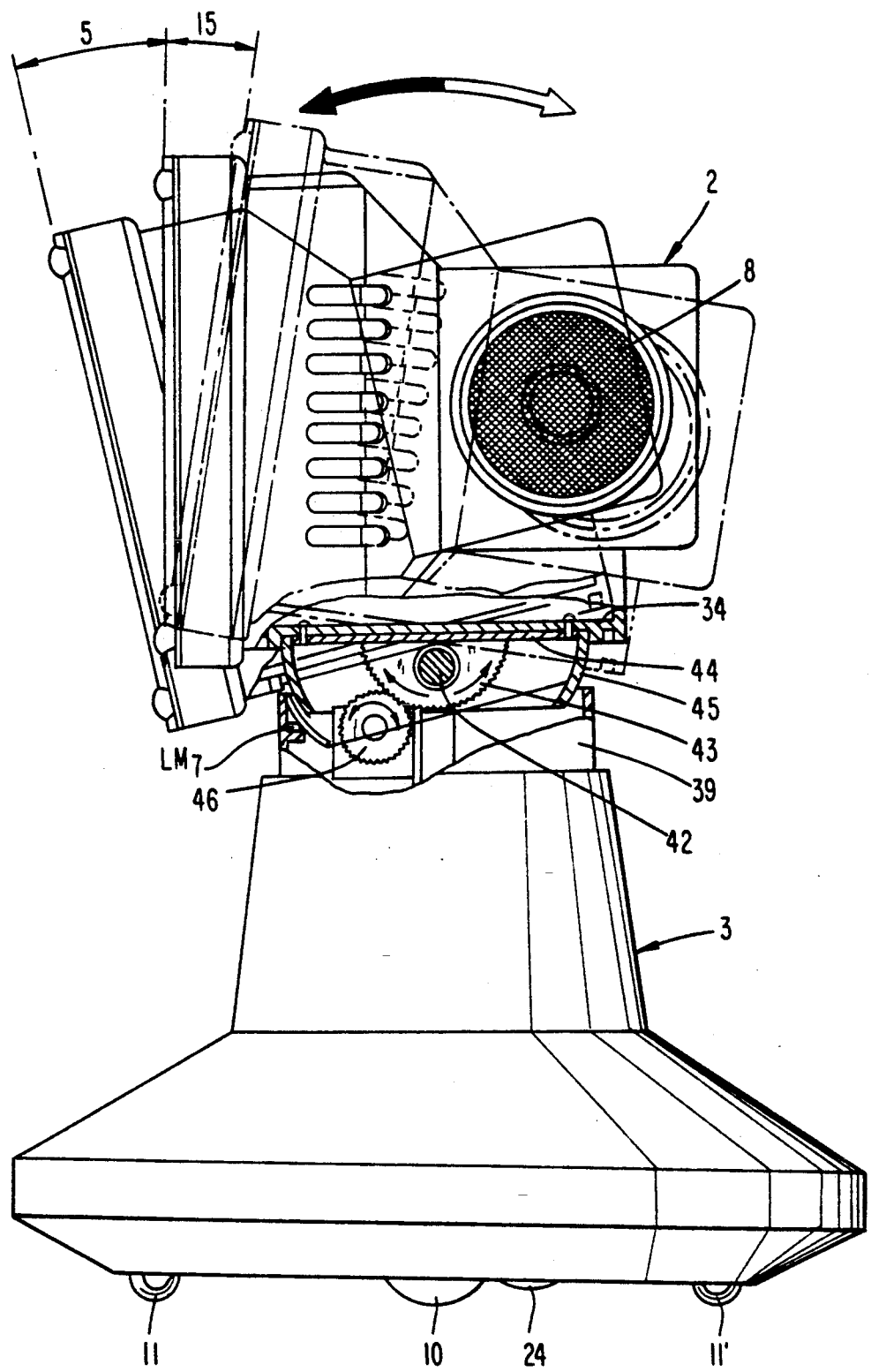
FIG. 16 is a side-view illustration of the back and forth motion and adjustment of the head portion.

When the viewer wants the head portion 2 of the receiver 1 to lean forward to backward, he should press the leaning-control button 57", the lowest of the mode selecting buttons 57, 57', 57" for the mode selection, as shown in FIG. 16.

Thereafter, in order for head portion 2 to lean forward at a certain degree, he should press the direction button (v) which finishes the movement of motor M5 installed at the fixing member 40 in the inner space of the drum-type moving member 39 under the head portion 2 and stops the turning of sector gear 43 going in engagement with spurgear 46.

Head portion 2 then leans forward no more and the viewer may watch the television with head portion 2 leaning forward properly.

Even if the viewer keeps pressing the direction button (v) of the remote control 56 by mistake, the head portion 2 leans forward no more than 5°.

As limit switch (LM) is installed at the point of the maximum allowable forward-leaning range 5°, in the upper end of the drum-type moving member 39 under semi-circular cover 45 and the connecting frame 44 fixed on the fixed rib 34 under the head portion 2, the leaning forward of head portion 2 by turning of the motor M5 turning reaches the maximum range of 5° and then the turning semi-circular cover 45 presses and activates the limit switch in the drum-type moving member 39 Hence, regardless of continued pressing of the direction button (v) of remote control 56, the limit switch (LM) stops the motor M5 on the connecting frame and controls the head portion 2 so that it does not lean forward more than 5°.

In this way, the viewer may optionally have the head portion 2 lean forward within the range of 5°, by operating the lowest of the four direction buttons ( ) (>) (v) (<), which turns clockwise the motor M5 on the fixing member 40 in space of the drum-type moving member 39 under the head portion 2.

Then, the spurgear 46 on the motor M5 rotates in the same direction and the sector gear 43 engaging therewith (installed in a single body with the sector shaft 42 on the upper end of the sector shaft 42 on the upper end of the sector arms 41, 41' of the fixing member 40) slowly starts to rotate anti-clockwise in engagement.

At this moment, the connecting frame 44 formed in a single body on the sector gear 43, surrounded by the fixed semi-circular cover 45 and fixed in a single body with the fixed rib 34 of head portion 2, turns in the same direction by the sector gear 43 turning in engagement therewith.

Head portion 2, fixed at the top of the connecting frame 44, rotates with the connecting frame 44 and slowly leans forward.

Here, the semi-circular cover 45 fixed around the connecting frame linked to the fixed rib 34 at the bottom of the head portion 2 covers up the rear space caused by leaning of the head portion 2 forward and maintains a fine appearance.

At the time head portion 2 has leaned forward as the viewer wants through such a mechanical procedure, he should release.

Likewise, when the viewer wants the head portion 2 to lean backward for a certain degree, he should press the direction button ( ) among the direction buttons ( ) (>) (v) (<) of the remote control 56. It turns anti-clockwise the motor installed on the fixing member 40 in space of the drum-type moving member 39 under the head portion 2 through the built-in circuit control, in the opposite way compared to that of the previous case.

The spurgear on motor M5 then turns in the same direction (anti-clockwise) and the sector gear 43, positioned at the top of the sector arms 41, 41' of fixing member 40 and operated by the sector shaft 42, starts to turn clockwise in engagement with spurgear 46 of the shaft of motor M5.

At this moment, the connecting frame installed on the sector gear 43, surrounded by the fixed semi-circular cover 45 and fixed on top with the fixed rib 34 turns in the same direction (clockwise) in engagement with sector gear 43.

Head portion 2 fixed on the connecting frame thus goes into motion with connecting frame 44, which results in head portion 2 leaning backward.

At this time, the semi-circular cover 45 surrounding the connecting frame 44 linked at the fixed rib 34 under the head portion 2 leans backward with the head portion 2 and covers up the space formed between the head portion 2 and the drum-type moving member 39.

When the head portion 2 of the receiver 1 has leaned backward as far as the viewer wants, he should release the direction button ( ) of the remote control 56. Then, the motor M5 installed on the connecting frame 44 stops and the movement of all the portions linked thereto stop, which finishes the leaning of head portion 2. The head portion 2 thus leans backward and is positioned as the viewer wants.

At this time, even though the viewer keeps pressing the direction button ( ) of the remote control 56 by mistake, head portion 2 leans backward no more than 15° owing to the limit switch LM6.

As limit switch LM6 is installed at the point of the maximum allowable backward-leaning range 15°, the head portion 2 leaning backward by turning of the motor M5 reaches the maximum range of 15° and the puts the limit switch LM6 in motion. The motor M5 on the fixing support 40 is stopped by the limit switch LM6 and the head portion 2 of the receiver 1 is controlled not to lean backward more than 15°.

As above, the viewer may optionally have the head portion 2 lean backward within the range of 15°.

As explained so far, this moving television receiver moves back and forth and left and right through remote control at the viewer's discretion, and the upper head portion of the receiver itself rotates left or right within the range of 30° as the viewer wants.

Also, the upper head portion may lean toward left or right within the range of 20° by operation of the remote control, if necessary, and the height of the upper head portion may be adjusted upward or downward within the range of 200 mm. Further, the head portion leans forward or backward within the range of 5° and 15° respectively.

Accordingly, in case a viewer wants to watch the moving television receiver 1 in the kitchen over a meal, after watching it in his bedroom, he may move the entire television receiver 1 to a position seen from the kitchen by operation of the remote control. In addition, he can remote-control the head portion on the body portion to be slanted to a selected degree and to rotate left or right by a selected angle. Further, the head portion itself may be adjusted to lean forward or backward and moved up or down in height.

Beyond the general concept of the television receiver this invention creates an exceptionally new image of the television receiver moving in all directions with multi-functions and high-technology.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

We claim:

1. An improved TV receiver comprising a head having a CRT tube and a body equipped with a position adjustment mechanism located in a space defined within the body, the improvement comprising:
    means for enabling said head to rotate by operation of said position adjustment mechanism inside said space and linked to said head;
    a freely-rotating caster and a pair of driving wheels which are coordinated with said position adjustment mechanism to be actuable by remote control means enabling the head and the body to move together, forward and backward and side to side, said remote-controlled position adjustment mechanism also being operable to enable said head to selectively tip left and right by a predetermined angle and to pan left and right to a predetermined extent.

2. The TV receiver according to claim 1, wherein:
    the position adjustment mechanism comprises a fixed frame provided in said space and a transmission shaft located in a low portion of said space to drive a driving shaft through a magnetic clutch and a sprocket linked by a chain to a driving sprocket of a double functioning motor supported by the fixed frame, the double-functioning motor supported by the fixed frame, the double-functioning motor being actuable to move the TV receiver backward and forward and to left and right by controlled operation thereof by a user operating the same by remote control.

3. A TV receiver according to claim 2, wherein:
    at the center of an upper side of the fixed frame, a footstep bearing is installed to support the vertical transmission shaft linked to the head by a fixed disc, a fixing member and a rotating disc; and
    at the bottom of the rotating disc on the vertical transmission shaft, a driven sprocket is installed and linked to a small sprocket on a motor installed on the upper side of the fixed frame,
    said motor being actuable by remote control so that the head is selectively controlled to turn with respect to the body by a predetermined angle not exceeding 60°.

4. A TV receiver according to claim 3, wherein:
    a round clutch provided on each side of the fixed disc at the bottom of the head, and a rotating roller engageable to the round clutches is installed on the upper side of a fixing member located on the upper side of a rotating disc in the space, a chain rack is installed at the bottom of the fixed disc so that it can be engaged with a first sprocket on a rotating shaft switch is installed on the fixing member, and
    a second sprocket linked to a third sprocket on the motor shaft of a motor mounted on the rotating disc, whereby remote control of the motor causes it to rotate and counter-rotate, and the mutually engaged first sprocket and said chain rack control motion of the head to cause it to pan left and right within a predetermined angle not exceeding 40°.

5. A TV receiver according to claim 2, wherein:
    the driving shaft and the transmission shaft are each in the form of two partial shafts coupled by a respective center magnetic clutch, and each of these center magnetic clutches is remote-controlled to allow the respective corresponding partial shafts to be rotated in integrally connected manner, and when the corresponding partial shafts are not integrally connected with each other by the respective magnetic clutch the rotation of the corresponding partial shafts is individually controlled.

6. A moving TV receiver according to claim 2, wherein;
    round clutches is formed on both sides of fixed disc on the bottom of the head, the rotating roller which is inserted to round clutches is installed on the upper side of the fixing member located on the upper side of rotating disc in the space room, a chain rack is installed on the bottom of the fixed disc so that it can be engaged with the sprocket (20c) on the rotating shaft which is installed on the fixing member, and the sprocket (20e) is linked to the sprocket (28b) on the motor shaft (M1) on the rotating disc and remote-control the motor to rotate and counter-counter-rotate, and the mutually engaged sprocket (20e) and chain rack control the head to pan left and right within a certain angle, not exceeding 40 degrees.

7. A moving TV receiver comprising:
    a remote control;
    a moving member, comprising a head in which is installed a CRT tube; and
    a body having a driving mechanism in a space inside the body, said head being linked to the mechanism so as to enable the head to move up and down while being supported by the body,
    said head being located at an upper portion of the moving member and said mechanism being operable to enable the head to rotate and to tip forward and backward by respective predetermined angles and also to controllably cause the moving member and the head to move up and down by a predetermined height by remote control by a viewer, wherein
    sector arms are formed on both ends of a fixed member provided in said space a sector shaft having a sector gear integrally formed thereon is rotatably mounted on an upper portion on the sector arms, and on an upper side of the sector gear a coupling frame is integrally formed and connected to a fixed rib, and
    on both ends of the fixed member a counter-rotatable motor equipped with a spur gear is thereby engaged to the sector gear,
    a signal from the remote control enabling a viewer to operate the sector gear engaged to the spur gear of the motor whereby the head located on the upper portion on the moving member is tipped forward by up to 5° degrees and backward by up to 15° degrees.

8. A moving TV receiver comprising:
    a remote control;
    a moving member, comprising a head in which is installed a CRT tube; and
    a body having a driving mechanism in a space inside the body, said head being linked to the mechanism so as to enable the head to move up and down while being supported by the body,
    said head being located at an upper portion of the moving member and said mechanism being operable to enable the head to rotate and to tip forward and backward by respective predetermined angles and also to controllably cause the moving member and the head to move up and down by a predetermined height by remote control by a viewer, and said head engages with a screw shaft rotatable by a motor located inside the moving member, said motor being remote-controlled for rotation and counter-rotation, controlled rotation of the screw shaft causing the head to move up and down within a range of 200 mm in height.

9. A moving TV receiver according to claim 8, wherein:

an internally threaded sprocket fixed on the screw shaft by a fixed bushing at the center of a fixing member inside the body, and the screw shaft and the screw thread are mutually engaged, allowing the screw shaft to move up and down in correspondence with controlled rotation and counter rotation of said internally threaded sprocket.

10. A moving TV receiver according to claim 8, wherein:

a fixed shaft is mounted on the lower end of the moving member is connected to the screw shaft at its lower portion, and a double row thrust bearing is installed therebetween so that the fixed shaft and the screw shaft can be separately operated.

11. A moving TV receiver, comprising:

a circuit comprising a diode (D1) which is linked to a micom output port (A) outputting a movement selection signal resistance (R1), and a condenser (C1) connected to a relay interrupt driving portion (A11) which can interrupt a relay (Ry1) and operate a motor;

diodes (D3, D5, D7), resistances (R2, R5, R8) and condensers (C2, C4, C6), linked to micom output ports (B, C, D) which output vertical and horizontal movement signals, and interrupt relays (Ry2, Ry3, Ry4) of motor driving portions (A11, A12, A13) are connected to a multiplexer (Q2, Q4, Q6);

diodes (D17, D19), resistances (R15, R16), condensers (C12, C13) and transistors (Q12, Q13) which interrupt relays (Ry9, Ry10), controlling a speed controller (SC3) linked to a switch circuit (B12) and operable for rotating a motor (M3) left and right in accordance with a signal from output port (B); and diodes (D9, D11), resistances (R11, R12), condensers (C8, C9) and transistors (Q8, Q9) linked to output ports (E, F,) to interrupt a relay (Ry6) and control a speed controller (SC1) and a motor (M1) that are connected to a switch circuit (B10);

wherein, when a driving portion of motor (M1) reaches a position corresponding to the lowest limit of a specified angle, switches (LM1, Lm2) generate a signal that interrupts the relays (Ry5, Ry6), and diodes (D13, D5), resistances (R13, R14), condensers (C10, C11) and transistors (Q10, Q11) are related to a micom output port (G, H) that directs a forward and backward movement of the moving receiver and interrupt relays (Ry7, Ry8)

whereby a signal via relay (Ry3) controls a speed controller (SC2) and a motor (M2) that are connected to a switch circuit (B11).

12. An adjustably viewable television receiver system, comprising:

a head portion comprising a television receiver screen;

a body portion adjustably supporting said head portion, said body portion being formed to define a space therewithin;

means for controllably adjusting a position of said head portion with respect to said body portion;

means for controllably moving said body portion with respect to a external surface supporting the same; and means for remotely controlling said head portion position adjustment and said body portion movement, said head portion position adjustment means and said body portion movement means both being substantially contained in said space in said body portion.

13. A television receiver system according to claim 12, wherein:

said head portion position adjustment means comprises means for enabling independent motion of said head portion relative to said body portion, said independent motion comprising translational motion in a vertical direction, rotational back-and-forth tipping motion and a side-to-side tilting motion, each with respect to said body portion, said remote control means enabling a viewer to selectively control said vertical, tipping and tilting motions within respective predetermined limits.

14. The television receiver system according to claim 13, wherein:

said remote control means comprises a hand-operated control unit including a plurality of push-buttons actuable to generate signals for producing said controlled vertical, tilting and tipping motions of said head portion with respect to said body portion and said controlled motions of said body portion within said limits.

15. The television receiver system according to claim 13, wherein:

said head portion position adjustment means and said body portion movement means each comprises separate electric motor means for providing a corresponding drive to respective drive means, whereby a user can remotely control selected operation of said respective motor means to adjust said position of said head portion with respect to said body portion, and also selectively obtain movement of said body portion, to orient said television receiver screen for convenient viewing thereof.

16. The television receiver system according to claim 15, wherein:

said head portion position adjusting means comprises a chain and sprocket drive driving a vertical screw element connected at an upper end to said head portion and supported at a lower end by a step bearing.

17. The television receiver system according to claim 13, wherein:

said body portion movement means comprises a pair of individually controlled driven wheels rotatable about a common horizontal axis, and a pair of load-bearing casters disposed to stably support said body portion and said head portion mounted thereon in cooperation with said pair of driven wheels, whereby controlled rotation of each of said pair of driven wheels enables controlled translational and rotational motions of said television receiver system on said external surface supporting the same.

18. The television receiver system according to claim 17, wherein:
said remote control means comprises a hand-operated control unit including a plurality of push-buttons actuable to generate signals for producing said controlled vertical, tilting and tipping motions of said head portion with respect to said body portion and said controlled translational and rotational motions of said body portion within said limits.

19. The television receiver system according to claim 18, further comprising:
an elongate flexible power cord for connecting said television receiver system to an external power supply system at a distance therefrom, whereby said television receiver system is operable by said remote control means within a predetermined range of physical movement corresponding to the length of said power cord.

20. The television receiver system according to claim 19, wherein:
said head portion position adjustment means and said body portion movement means each comprises separate electric motor means for providing a corresponding drive to respective drive means,
whereby a user can remotely control selected operation of said respective motor means to adjust said position of said head portion with respect to said body portion, and also selectively obtain movement of said body portion, to orient said television receiver screen for convenient viewing thereof.

21. The television receiver system according to claim 20, further comprising:
means for compactly and releasably storing a length of said power cord and releasing portions of said stored length as necessitated by said movement of said body portion.

22. A television receiver system according to claim 12, wherein:
said body portion movement means comprises a pair of individually controlled driven wheels rotatable about a common horizontal axis, and
a pair of load-bearing casters disposed to stably support said body portion and said head portion mounted thereon in cooperation with said pair of driven wheels,
whereby controlled rotation of each of said pair of driven wheels enables controlled translational and rotational motions of said television receiver system on said external surface supporting the same.

23. The television receiver system according to claim 22, wherein:
said pair of driven wheels are individually connected to respective coaxially aligned shafts coupled to magnetic clutch means rotatable by a corresponding motor means to produce controlled translational and rotational motions of said body means with respect to said external surface supporting the same.

24. The television receiver system according to claim 12, further comprising:
an elongate flexible power cord for connecting said television receiver system to an external power supply system at a distance therefrom, whereby said television receiver system is operable by said remote control means within a predetermined range of physical movement corresponding to the length of said power cord.

25. The television receiver system according to claim 24, further comprising:
means for compactly and releasably storing a length of said power cord and releasing portions of said stored length as necessitated by said movement of said body portion.

26. An adjustably viewable television receiver system, comprising:
a head comprising a television receiver screen;
a body, securely engaged with and adjustably supporting said head;
means for adjusting a position of said head relative to said body, comprising means for selectively raising/lowering said head with respect to said body, rotating said head with respect to said body about a vertical direction, selectively tilting said head with respect to said body to the left or the right as viewed by the viewer frontally viewing said receiver screen, and selectively tipping said head with respect to said body forwardly or backwardly with respect thereto as viewed by said viewer viewing said receiver screen frontally;
means for moving said body with respect to an external surface supporting the same; and
means for remotely controlling said head position adjustment and said body movement.

27. The television receiver system according to claim 20, wherein:
said head position adjustment means and said body movement means are contained within a substantially enclosed space defined within said body so as to be essentially out of sight of said viewer.

28. The television receiver system according to claim 27, further comprising:
a flexible elongate power cord having a plug element at a distal end and connected at an opposite end to said body to enable provision of electrical power to said television receiver system, and
means disposed between said ends of said cord means to compactly and releasably store portions of a length thereof.

* * * * *